US012127325B2

(12) United States Patent
Smirnov et al.

(10) Patent No.: US 12,127,325 B2
(45) Date of Patent: Oct. 22, 2024

(54) SYSTEMS, DEVICES, AND METHODS FOR SECONDARY PARTICLE SUPPRESSION FROM A CHARGE EXCHANGE DEVICE

(71) Applicant: TAE TECHNOLOGIES, INC., Foothill Ranch, CA (US)

(72) Inventors: Artem N. Smirnov, Mission Viejo, CA (US); Vladislav Vekselman, Lake Forest, CA (US); Vladimir I. Davydenko, Novosibirsk (RU); Alexandr A. Ivanov, Novosibirsk (RU); Michael Meekins, Silverado, CA (US); Blake Koop, Jr., Laguna Hills, CA (US)

(73) Assignee: TAE TECHNOLOGIES, INC., Foothill Ranch, CA (US)

( * ) Notice: Subject to any disclaimer, the term of this patent is extended or adjusted under 35 U.S.C. 154(b) by 624 days.

(21) Appl. No.: 17/225,725

(22) Filed: Apr. 8, 2021

(65) Prior Publication Data

US 2021/0345476 A1 Nov. 4, 2021

Related U.S. Application Data

(60) Provisional application No. 63/007,612, filed on Apr. 9, 2020.

(51) Int. Cl.
*H05H 3/06* (2006.01)

(52) U.S. Cl.
CPC .................................... *H05H 3/06* (2013.01)

(58) Field of Classification Search
CPC ................................ H05H 3/06; H05H 5/063
See application file for complete search history.

(56) References Cited

U.S. PATENT DOCUMENTS 3,657,542 A * 4/1972 Futch, Jr. ................ G21K 1/14 976/DIG. 437
5,300,891 A * 4/1994 Tokoro .................... G21K 1/14 250/251
5,693,939 A * 12/1997 Purser ..................... H05H 3/02 250/251

(Continued)

FOREIGN PATENT DOCUMENTS

RU 2 558 384 C2 8/2015
RU 2 595 785 C2 8/2016

(Continued)

OTHER PUBLICATIONS

Belchenko, Y., et al., "Status of High-Current Electrostatic Accelerator—Tandem for the Neutron Therapy Facility", Proceedings of the Second Asian Particle Accelerator Conference, Beijing, China, 2001, pp. 849-851.

(Continued)

*Primary Examiner* — David A Vanore
(74) *Attorney, Agent, or Firm* — ALSTON & BIRD LLP

(57) ABSTRACT

Embodiments of systems, devices, and methods relating to a charge exchange system having one or more guard apparatuses are described. The guard apparatuses can include one (Continued)

or more guard electrodes, optionally with one or more screen electrodes. Also described are embodiments of beam systems incorporating one or more charge exchange systems.

14 Claims, 13 Drawing Sheets

(56) References Cited

U.S. PATENT DOCUMENTS

| | | | | | |
|---|---|---|---|---|---|
| 6,069,459 | A * | 5/2000 | Koudijs | H05H 5/06 | 315/501 |
| 6,414,327 | B1 * | 7/2002 | Klinkowstein | G21K 1/14 | 250/492.21 |
| 6,815,666 | B2 * | 11/2004 | Schroeder | H01J 49/0086 | 250/296 |
| 7,501,624 | B1 * | 3/2009 | Farrell | G01N 23/22 | 378/53 |
| 9,000,364 | B2 * | 4/2015 | Ermakov | H01J 49/4245 | 250/281 |
| 10,049,774 | B2 * | 8/2018 | Tuszewski | H05H 1/14 | |
| 2010/0084549 | A1 * | 4/2010 | Ermakov | H01J 49/4245 | 250/293 |
| 2015/0187443 | A1 * | 7/2015 | Tuszewski | G21B 1/052 | 376/101 |
| 2015/0245461 | A1 * | 8/2015 | Belchenko | H05H 3/02 | 250/251 |
| 2021/0076481 | A1 * | 3/2021 | Jauregui | H05H 6/00 | |
| 2021/0138273 | A1 * | 5/2021 | Dunaevsky | A61N 5/1048 | |
| 2021/0151308 | A1 * | 5/2021 | Killer | G21K 5/04 | |
| 2021/0345476 | A1 * | 11/2021 | Smirnov | H05H 3/06 | |
| 2022/0078900 | A1 * | 3/2022 | Vekselman | H05H 5/063 | |

FOREIGN PATENT DOCUMENTS

| | | | |
|---|---|---|---|
| RU | 2 634 310 | C1 | 10/2017 |
| WO | WO 2014/039579 | A2 | 3/2014 |
| WO | WO 2016/032822 | A1 | 3/2016 |

OTHER PUBLICATIONS

Davydenko, V. I., et al., "Stripping target of 2.5 MeV 10 mA tandem accelerator," AIP Conference Proceedings, 2005, vol. 763, pp. 332-336.

Ivanov, A., et al., "Suppression of an unwanted flow of charged particles in a tandem accelerator with vacuum insulation", Journal of Instrumentation, 2016, vol. 11, Issue 4, pp. 1-8.

Kasatov, D., et al., "Recording of Current Accompanying an Ion Beam in a Tandem Accelerator with Vacuum Insulation", Tech. Phys. Lett., 2015, vol. 41, No. 2, pp. 139-141.

Kasatov, D., et al., "The accelerator neutron source for boron neutron capture therapy", 18th International Conference PhysicA. SPb, Journal of Physics: Conference Series, 2016, vol. 769, pp. 1-6.

* cited by examiner

SYSTEMS, DEVICES, AND METHODS FOR SECONDARY PARTICLE SUPPRESSION FROM A CHARGE EXCHANGE DEVICE

CROSS-REFERENCE TO RELATED APPLICATIONS

This application claims the benefit of, and priority to, U.S. provisional application Ser. No. 63/007,612, filed Apr. 9, 2020, which is incorporated by reference herein in its entirety for all purposes.

FIELD

The subject matter described herein relates generally to systems, devices, and methods for suppression of secondary particles resulting from particle beam interaction with a gaseous medium in a charge exchange device.

BACKGROUND

Charge exchange devices are a class of devices that are capable of modifying an incident beam of particles such that the net charge of the beam output from the charge exchange device is altered. For example, a charge exchange device can convert an input beam having a negative net charge to an output beam having a positive net charge, or alternatively can convert an input positive beam into an output negative beam. Charge exchange devices can also operate to reduce or increase the magnitude of the net charge without reversing the beam's polarity (e.g., by reducing a relatively high net negative (or positive) charge to a relatively low net negative (or positive) charge). Charge exchange devices can be configured to modify the net charge by removing charged particles such as electrons and, in such instances, can also be referred to as charge removal devices. Charge exchange devices can be used in any application where charge modification of a particle beam is desired.

Charge exchange devices are useful, for example, in particle beam systems having a particle accelerator. Particle accelerators are machines that accelerate various particles from a relatively low energy to a relatively higher energy. A tandem accelerator is a type of particle accelerator that accelerates the particle beam in at least two stages, where the beam has a different polarity in each stage. Reversal of the polarity of the beam can be accomplished by use of a charge exchange device. The electrostatic fields can be applied by a single high voltage, and thus inversion of polarity doubles the usage of the accelerating voltage. The beams produced by tandem accelerators, and particle accelerators more generally, can be used in a wide range of applications.

The efficiency of the charge exchange process depends, among other things, on the beam energy and on the density of the charge exchange medium. Charge exchange devices having a solid substrate or target, such as a thin conductive foil, can modify charge state as the beam passes therethrough. Beams with relatively high currents (e.g., approximately 1 milliamp (mA) and above) and high energies impose higher thermal fluxes, which drastically shortens the lifetime of the solid substrate. In tandem accelerators with a relatively high beam energy and with relatively low beam currents, a thin conductive foil is often used as the charge exchange medium. Charge exchange devices in applications that impose high thermal fluxes often use a gaseous charge exchange medium instead of a solid substrate as the gaseous medium is more resistant to high temperature.

Interaction of the beam with the charge exchange medium leads to ionization of atoms of the charge exchange medium and formation of plasma, either on the surface of the solid substrate or in the volume of the charge exchange gas. This plasma is a source of secondary ions that can reduce system reliability and detrimentally impact the output parameters of the accelerator system.

For example, the secondary ions can be co-accelerated with the beam, forming a parasitic secondary ion beam. The presence of secondary charged particles in the region of strong accelerating fields in the tandem accelerator can increase the dark current, which in turn generates more load on the power system. The flux of secondary ions may result in redistribution of the potentials inside the tandem accelerator and also in excessive heating, as a consequence of strong secondary particle emissions induced by ion-surface interactions. Secondary particle emissions from ion-surface interactions can be are typically characterized by a secondary emission coefficient that reflects the number of secondary particles emitted for each single incident particle. This secondary emission coefficient can exceed ten for such ion-surface interactions. Heating can decrease the structural integrity or strength of the components under high voltage, which in turn can cause failures or breakdowns. Generation of x-rays and gamma-rays can also reduce the high voltage strength of insulators. These photons (either x-ray or gamma-ray) are typically generated by electrons produced as secondaries (and further accelerated to kiloelectronvolt (keV) range energies in a local electric field) in atomic interactions with the surrounding medium.

Some secondary ions formed in or on the charge exchange device may be accelerated to high energy and escape, forming a flux of energetic particles propagating towards other components of the accelerator system. This flow of energetic particles can interact with the other components and reduce the overall reliability of the system.

A number of prior solutions to reduce the emission of secondary ions have been proposed, but all are deficient in some respect. For example, for a gas-based charge exchange device, prior solutions primarily relied on decreasing the background pressure of the charge exchange gas inside the charge exchange device, or by more efficient pumping of the charge exchange gas. This method was described in A. Ivanov et al., "Suppression of an unwanted flow of charged particles in a tandem accelerator with vacuum insulation," *J. Instrum., vol.* 11, no. 04, pp. P04018-P04018, April 2016. Reduction of the charge exchange gas pressure, however, is limited by the efficiency of the charge exchange device. Lower gas pressure requires larger dimensions of the charge exchange device to compensate for a decrease in the charge exchange efficiency.

Deflection of secondary particles with a magnetic field has been proposed to directly suppress the emission of secondary particles from the charge exchange device. See, e.g., D. A. Kasatov, A. N. Makarov, S. Y. Taskaev, and I. M. Shchudlo, "Recording of current accompanying an ion beam in a tandem accelerator with vacuum insulation," *Tech. Phys. Lett., vol.* 41, no. 2, pp. 139-141, February 2015. Russian Patent No. 2558384 C2 describes an approach to diminish negative effects of secondary particles emitted from a charge exchange device by relying on the deflection of charged particles in an externally applied magnetic field due to action of the Lorentz force. The magnetic field, which is orthogonal to the beam propagation direction in order to achieve the maximum efficiency in charged particle deflection, is created by permanent magnets on both edge sides of the charge exchange device. However, because primary charged particles of the beam are also affected by this magnetic field, the charge exchange device is tilted to transport the beam through the entire assembly. Unfortunately, this approach implies specific limitations on the input beam energy. Russian Patent No. 2634310C1 describes a modified version of the system described in Russian Patent No. 2558384 C2, where permanent magnets are replaced by alpha-magnets. The alpha magnets are developed to deflect the beam primary charged particles to a specific angle (270°) independently on the beam energy. Russian Patent No. 2595785 C2 describes a different configuration of the magnets, where two magnets are used instead of an alpha magnet.

Magnetic suppression, however, is undesirable for beams with a wide range of beam energy because both primary and secondary charged particles are affected by the magnetic field. Trajectories of the beam particles in the magnetic field depend on the beam energy. Correction of the beam deflection or shift is necessary when the beam energy is changed. This complicates the design, which in turn can lead to detrimental impact on the reliability of the tandem accelerator. For example, larger magnets require more space resulting in severe damage after breakdowns as more energy is accumulated by the tandem accelerator. The use of permanent magnets in Russian Patent No. 2558384 C2 results in an energy dependent deflection of the beam from its optimal trajectory inside the charge exchange device. The small aperture of a gas charge exchange device limits the incident beam energy to a very narrow range, which is not acceptable for many applications. In the designs described in Russian Patent Nos. 2634310 C1 or 2595785 C2, the beam space coordinates are still disturbed by the alpha magnets. While this approach allows the gas charge exchange device to be kept in place for arbitrary beam incident energies, it likely requires the aperture size to be increased. In addition, it likely leads to non-negligible beam spreading due to a finite beam size. The large deflection angle (270°) also demands the use of either strong magnets or large magnets which negatively affects the reliability of the tandem accelerator.

Another approach used to suppress the emission of secondary particles is based on the deflection of secondary particles by an electrostatic field, as described in WO2016/032822 and D Kasatov et al., "The accelerator neutron source for boron neutron capture therapy" J. Phys.: Conf. Ser. 769 (2016) 012064. Application of a positive potential to a set of bias or guard electrodes reportedly repels ions of the plasma expanding out of the charge exchange device. Even though positive bias relative to potential of the charge exchange device body is effective for suppression of the positive ions, it attracts electrons from the plasma expanding from the charge exchange device. Due to the larger mobility of electrons compared to ions, the electron net flux towards the guard electrodes is larger by two orders of magnitude. High collected current requires a high power biasing power supply, which also complicates the design. Also, the surface of the guard electrodes can be overheated by the collected electron current and can require cooling to dissipate the incoming thermal flux.

For these and other reasons, a need exists for improved systems, devices, and methods that facilitates the suppression of secondary particles from charge exchange devices.

SUMMARY

Example embodiments of systems, devices, and methods are described herein for the efficient suppression of secondary particles from a charge exchange device. Many of these example embodiments incorporate one or more guard electrodes at one or both ends of the charge exchange device. These guard electrodes can be biased at a polarity that attracts oppositely charged secondary particles and repels similarly charged particles.

Example embodiments for the suppression of secondary particles are also disclosed for a charge exchange device present within a particle accelerator, such as a tandem accelerator. These embodiments a guard apparatus can be present on one or both ends of the charge exchange device and this guard apparatus can include one or more guard electrodes, and optionally one or more screen electrodes. In certain example applications, the tandem accelerator has multiple input electrodes for accelerating an input negative particle beam, a charge exchange device for reversing the polarity of that negative particle beam to form a positive particle beam, and multiple output electrodes for accelerating the resulting positive particle beam. In these example applications the guard electrodes are biased negatively with respect to the charge exchange device. This negative biasing can attract positive secondary particles formed within the charge exchange device, thus either capturing those particles or deflecting them into other components. This negative biasing can also repel negative particles like electrons, that can then be captured by the charge exchange device itself or other components. These and other embodiments described herein are thus suitable for the suppression of secondary ions formed in systems utilizing or acting upon particle beam.

Example embodiments are also described for the shielding of the charge exchange device and the sensing of current at a location in close proximity with the inlet of the charge exchange device using, for example, an aperture structure. Embodiments are also described for the independent biasing of the aperture structure, the independent biasing of the charge exchange device, and the sensing of current through the charge exchange device.

Other systems, devices, methods, features and advantages of the subject matter described herein will be or will become apparent to one with skill in the art upon examination of the following figures and detailed description. It is intended that all such additional systems, methods, features and advantages be included within this description, be within the scope of the subject matter described herein, and be protected by the accompanying claims. In no way should the features of the example embodiments be construed as limiting the appended claims, absent express recitation of those features in the claims.

BRIEF DESCRIPTION OF FIGURES

The details of the subject matter set forth herein, both as to its structure and operation, may be apparent by study of the accompanying figures, in which like reference numerals refer to like parts. The components in the figures are not necessarily to scale, emphasis instead being placed upon illustrating the principles of the subject matter. Moreover, all illustrations are intended to convey concepts, where relative sizes, shapes and other detailed attributes may be illustrated schematically rather than literally or precisely.

DETAILED DESCRIPTION

Before the present subject matter is described in detail, it is to be understood that this disclosure is not limited to the particular embodiments described, as such may, of course, vary. It is also to be understood that the terminology used herein is for the purpose of describing particular embodiments only, and is not intended to be limiting, since the scope of the present disclosure will be limited only by the appended claims.

Example embodiments of systems, devices, and methods are described herein for a secondary particle suppression from a charge exchange device. The term "particle" is used broadly and covers an electron, a proton (or H+ ion), or a neutral, as well as a species having more than one electron, proton, and/or neutron (e.g., other ions, atoms, and molecules).

Figure 1:
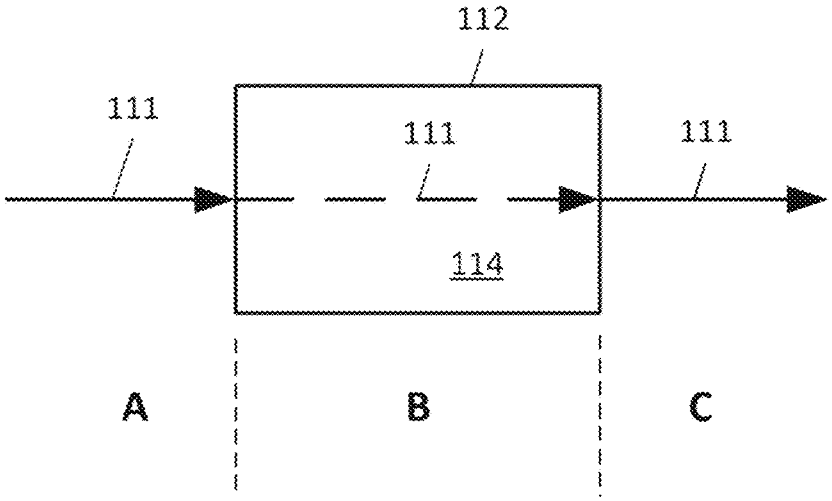
FIG. 1 is a block diagram depicting an example embodiment of a charge exchange device.

FIG. 1 is a block diagram depicting an example embodiment of a charge exchange device (CXD) 112 having a charge exchange medium 114, which can be a gas, liquid, or solid. FIG. 1 depicts a particle beam 111 at various regions of interaction with charge exchange device 112. In region A, particle beam 111 has a first polarity (e.g., positive or negative) and approaches CXD 112. Region B corresponds to the volume where particle beam 111 passes through charge exchange device 112 where the polarity of beam 111 is gradually changed or reversed (e.g., from negative to positive). In region C particle beam 111 is output from CXD 112 having a polarity opposite that which beam 111 had in region A.

CXD 112 can operate and/or be configured in various different manners. For example, if beam 111 is a negative ion beam, then CXD 112 can operate by removal of negative charged particles (e.g., electrons) thus leaving charged particles having positive and/or neutral polarities (e.g., protons, neutrals) to form beam 111. The process of changing beam polarity can be relatively abrupt or relatively gradual in space depending on the configuration of CXD 112. In many embodiments described herein, CXD 112 utilizes a gaseous medium 114 (e.g., xenon, nitrogen, argon, or others) that performs charge exchange as the beam passes therethrough. CXD 112 can use this gaseous medium 114 alone or in combination with other media as well, such as a solid structure or target such as a thin foil (e.g., carbon or metallic) that also performs charge exchange as the beam passes therethrough. In some embodiments, CXD 112 uses only a solid or liquid medium 114.

Figure 2A:
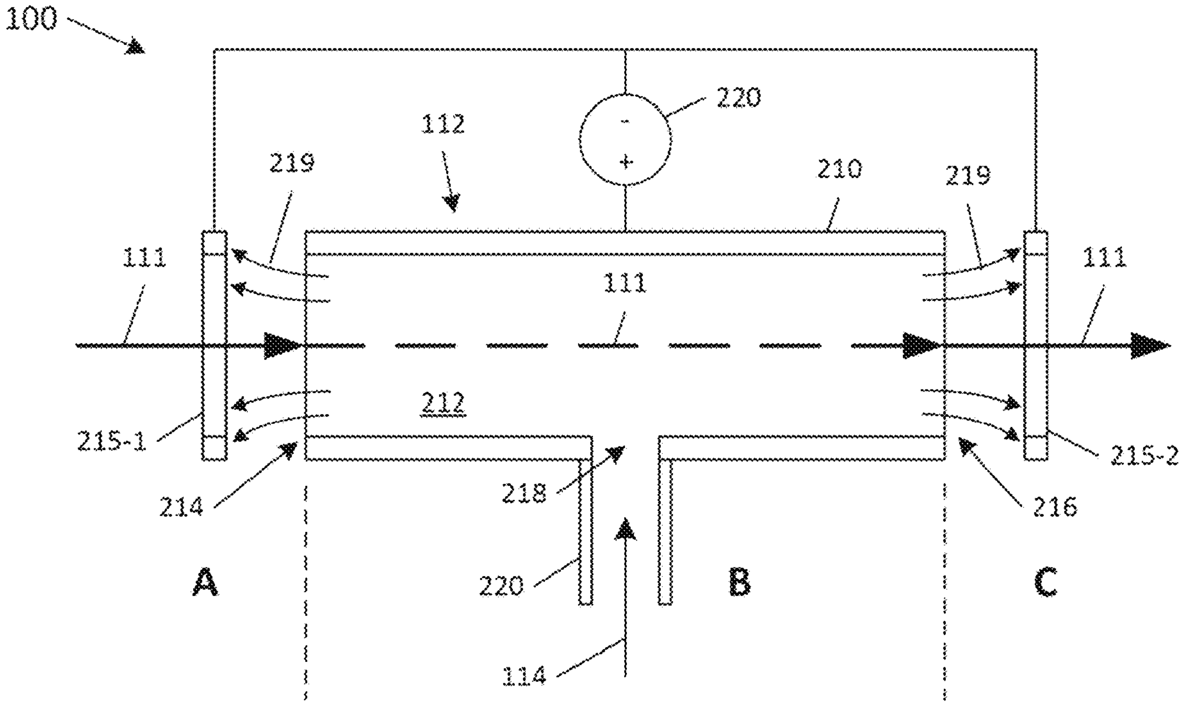
FIG. 2A is a partial cross-sectional view and block diagram of an example embodiment of a charge exchange system.
Figure 2B:
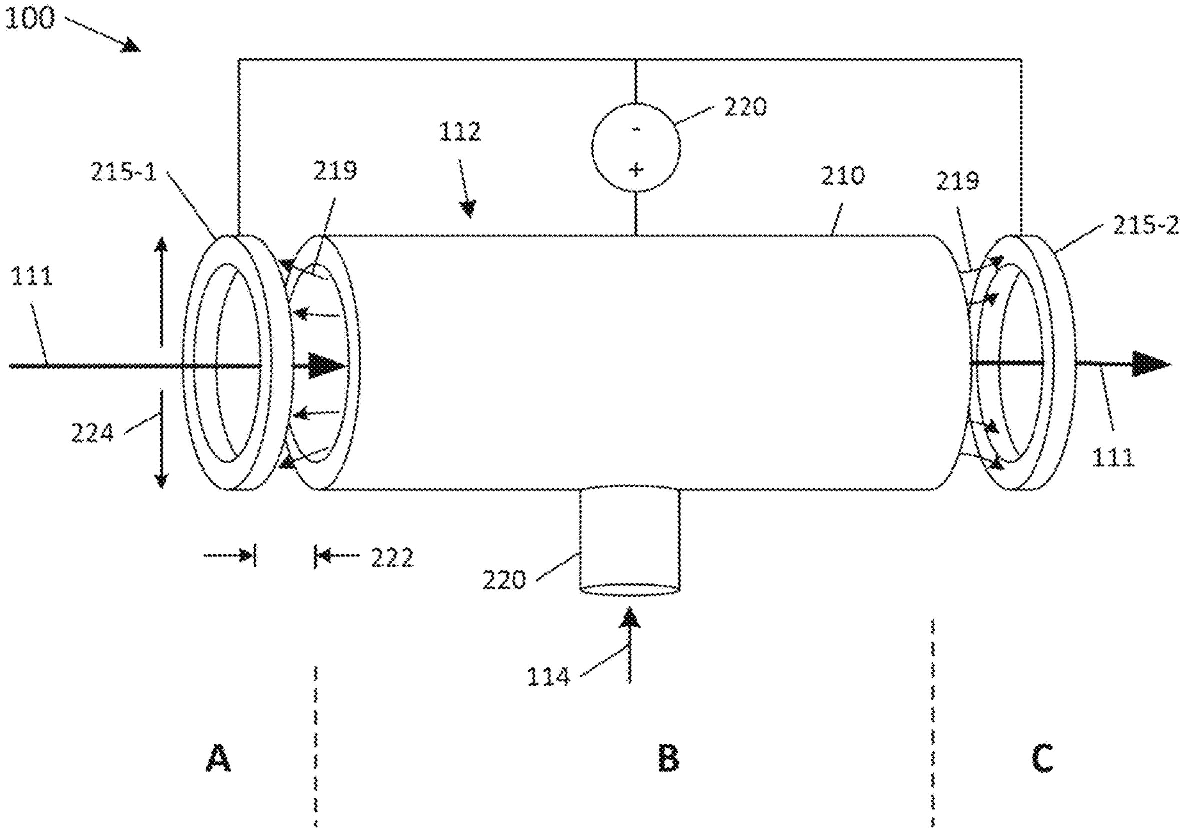
FIG. 2B is a perspective view and block diagram of the charge exchange system embodiment of FIG. 2A.

FIGS. 2A and 2B are a partial cross-sectional view and a perspective view, respectively, depicting an example embodiment of a charge exchange system 100 having CXD 112. In this embodiment, CXD 112 is a tubular structure 210 having an inner lumen 212, an open beam inlet 214, and an open beam outlet 216. Tubular structure 210 also has a gas inlet 218 that is connected to a gas conduit 220 through which gaseous medium 114 can be introduced to inner lumen 212. CXD 112 is configured to at least temporarily hold gaseous medium 114 while within lumen 212. Beam 111 is depicted as a straight line (solid and dashed) with respect to CXD 112, and indeed may have a diameter that is minimal in comparison to the diameter of CXD 112 (e.g., 5%). But in many embodiments beam 111 is larger and can be, to name a few examples, up to 50%, 70%, or 90% of the diameter of CXD 112.

In this embodiment, beam 111 is an ion beam having one or more protons and one or more electrons in region A (prior to passing through charge exchange device 212). As beam 111 passes through CXD 112, gaseous medium 114 removes electrons from ion beam 111 without substantially removing protons to gradually convert beam 111 from a net negative charge to a net positive charge. Beam 111 is output from CXD 112 with a net positive charge in region C. Because charge exchange device 112 removes charge from beam 111 can also be referred to as a charge removal device.

Gaseous medium 114 can be any desired gas that facilitates the exchange or removal of charge. A gaseous medium 114 with a relatively higher cross-section for interaction with the desired particle to be removed will tend to operate more efficiently than gas with a lower cross-section. Gases such as argon and nitrogen are effective to remove electrons, although the embodiments described herein are not limited to use with any particular gas. While the gas may be heated such that it turns to plasma under certain conditions, for purposes of convenience the medium under those conditions will be referred to as a gas.

The removal of charge from beam 111 by gaseous medium 114 causes a fraction of gaseous medium 114 to ionize, or form secondary ions. As mentioned earlier, the secondary ions can detrimentally affect the performance of a particle beam system such as an accelerator. In the embodiments disclosed herein, system 100 can include one or more guard electrodes that suppress these secondary ions. Based on the relative potentials of the guard electrodes and the ions, and the shape and placement of the guard electrodes, among other factors, the guard electrodes can suppress secondary particles by collecting or attracting those particles, impeding movement of the particles, redirecting movement of the particles, repelling particles, or others.

The guard electrodes can be placed on one or both ends of CXD 112. In the embodiment of FIGS. 2A-2B, a first guard electrode 215-1 is positioned adjacent inlet 214 and a second guard electrode 215-2 is positioned adjacent outlet 216. Positive secondary ions are formed within CXD 112 as beam 111 is converted from negative to positive. An electric potential is applied to guard electrodes 215 such that they are negative with respect to the potential placed on tubular structure 210. This is indicated by voltage source 220. The negative potential attracts positive secondary ions created from gas 114, which are collected by the guard electrodes 215, as indicated by arrows 219. Guard electrodes 215 are also referred to as attractor electrodes herein. In embodiments where electrodes 215 primarily repel ions, such electrodes can be referred to as repelling electrodes.

Attractor electrodes 215 can be integrated with or affixed to tubular structure 210. Alternatively, as shown here, each attractor electrode 215 can be positioned such that a gap is present between it and the respective inlet 214 or outlet 216 of CXD 112. This gap can allow gaseous medium 114 to flow out of and away from CXD 112, since the formation of secondary ions reduces its effectiveness. The gaseous medium 114 can be continually replaced by the introduction of new gas 114 through conduit 220. The length 222 of each gap can vary based on the needs of the particular implementation. In other embodiments, the gap can be replaced by an insulator or insulative component that allows the different electrode and tube potentials to be applied without shorting, and gas 114 can exit through the center of electrodes 215. Alternatively or additionally, apertures can be placed in tubular structure 210, the insulator (not shown), and/or attractor electrodes 215 to permit the passage of gas 114 therethrough.

Tubular structure 210 is shown here as being cylindrical with open ends. However, other shapes can be utilized including, but not limited to, symmetric and asymmetric shapes, shapes with circular cross-sections (as depicted here), elliptical, polygonal, combinations thereof, and other cross-sections. Restrictive structures can be placed at or near inlet 214 and outlet 216 to impede or restrict the flow of gas 214 from within lumen 212. Attractor electrodes 215 are shown here as tubular or cylindrical structures having a similar outer diameter 224 (and inner diameter) but shorter longitudinal length as compared to structure 210.

Attractor electrodes 215 can likewise have other shapes including, but not limited to, symmetric and asymmetric shapes, shapes with circular end-on profiles (e.g., FIG. 4D), elliptical, polygonal, combinations thereof, and other cross-sections. Attractor electrodes 215 can have the same shape and dimensions or be different from each other. Attractor electrodes 215 can match the radial dimensions (e.g., inner and outer diameter) of structure 210 or differ therefrom. More than one attractor electrode 215 can be placed at or near inlet 214 and more than one attractor electrode 215 can be placed at or near outlet 216 and the structural configurations and voltage is applied to each such electrode 215 can be the same or different.

While one gas inlet 218 and corresponding conduit 220 is shown here, CXD 112 can have multiple inlets 218 and conduits 220 in different locations. While not shown here, CXD 112 can have additional structures or devices coupled thereto such as those configured for mounting tubular structure 210 and/or attractor electrodes 215, applying voltages to structure 210 and/or guard electrodes 215, and/or cooling the temperature of structure 210 and/or attractor electrodes 215.

Charge exchange system 100 can be used as part of any application where charge exchange occurs for a particle beam. Particle accelerators are a common example, and charge exchange system 100 can be used with any type of particle accelerator or in any particle accelerator application. For example, charge exchange system 100 can be used in particle accelerators used as scientific tools, such as for nuclear physics research. System 100 can also be used in particle accelerators implemented in industrial or manufacturing processes, such as the manufacturing of semiconductor chips, the alteration of material properties (such as surface treatment), the irradiation of food, and pathogen destruction in medical sterilization. System 100 can further be used in imaging applications, such as cargo or container inspection. And by way of another non-exhaustive example, system 100 can be used in particle accelerators for medical applications, such as medical diagnostic systems, medical imaging systems, or radiation therapy systems.

In many embodiments, charge exchange system 100 can be implemented within a tandem accelerator. For ease of description, the following embodiments will be described with charge exchange system 100 implemented in a tandem accelerator that converts a negative hydrogen ion beam to a positive particle beam, specifically a proton beam.

Figure 3A:
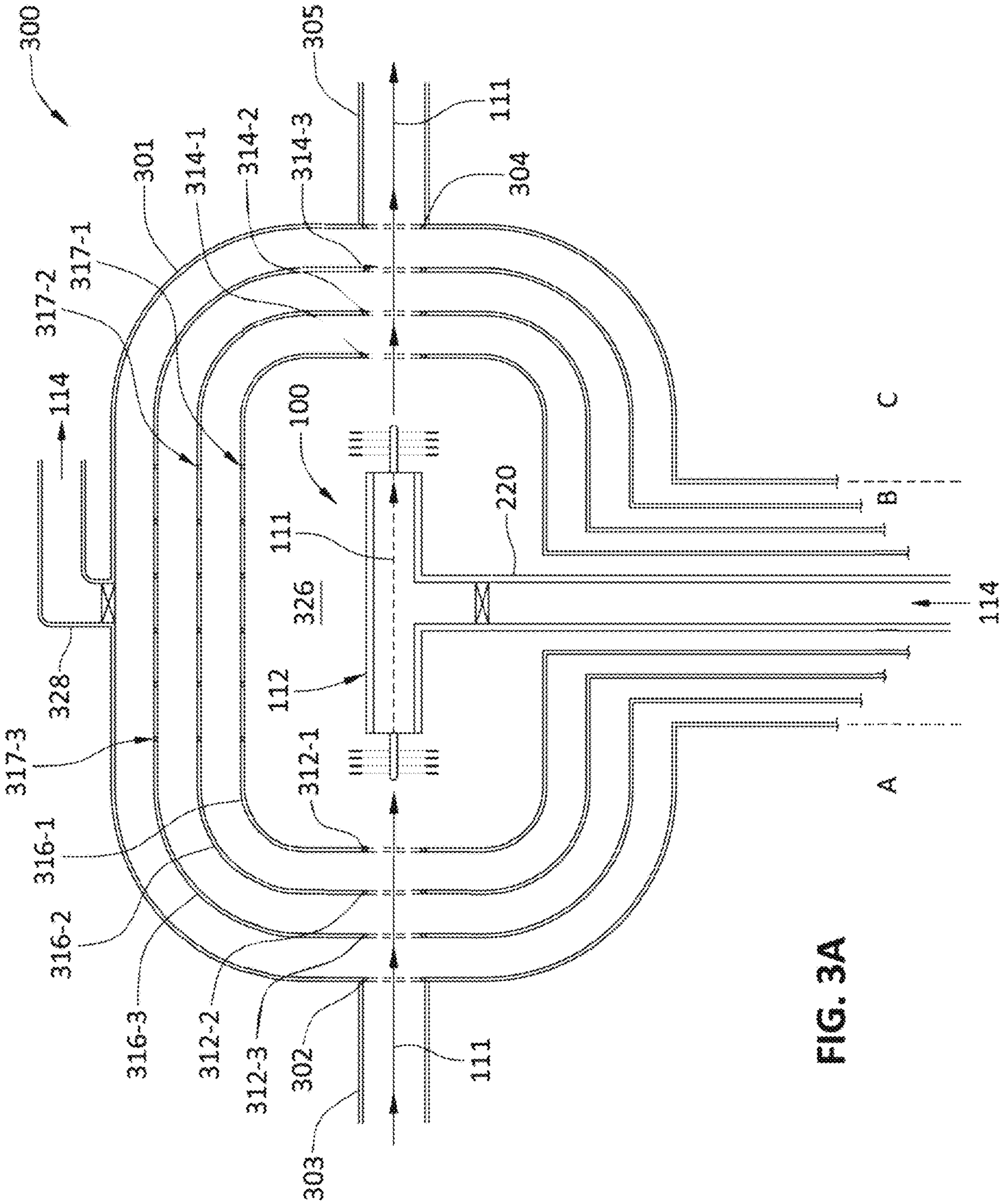
FIG. 3A is a partial cross-sectional view and block diagram of an example embodiment of a tandem accelerator having an example embodiment of a charge exchange system.
Figure 3B:
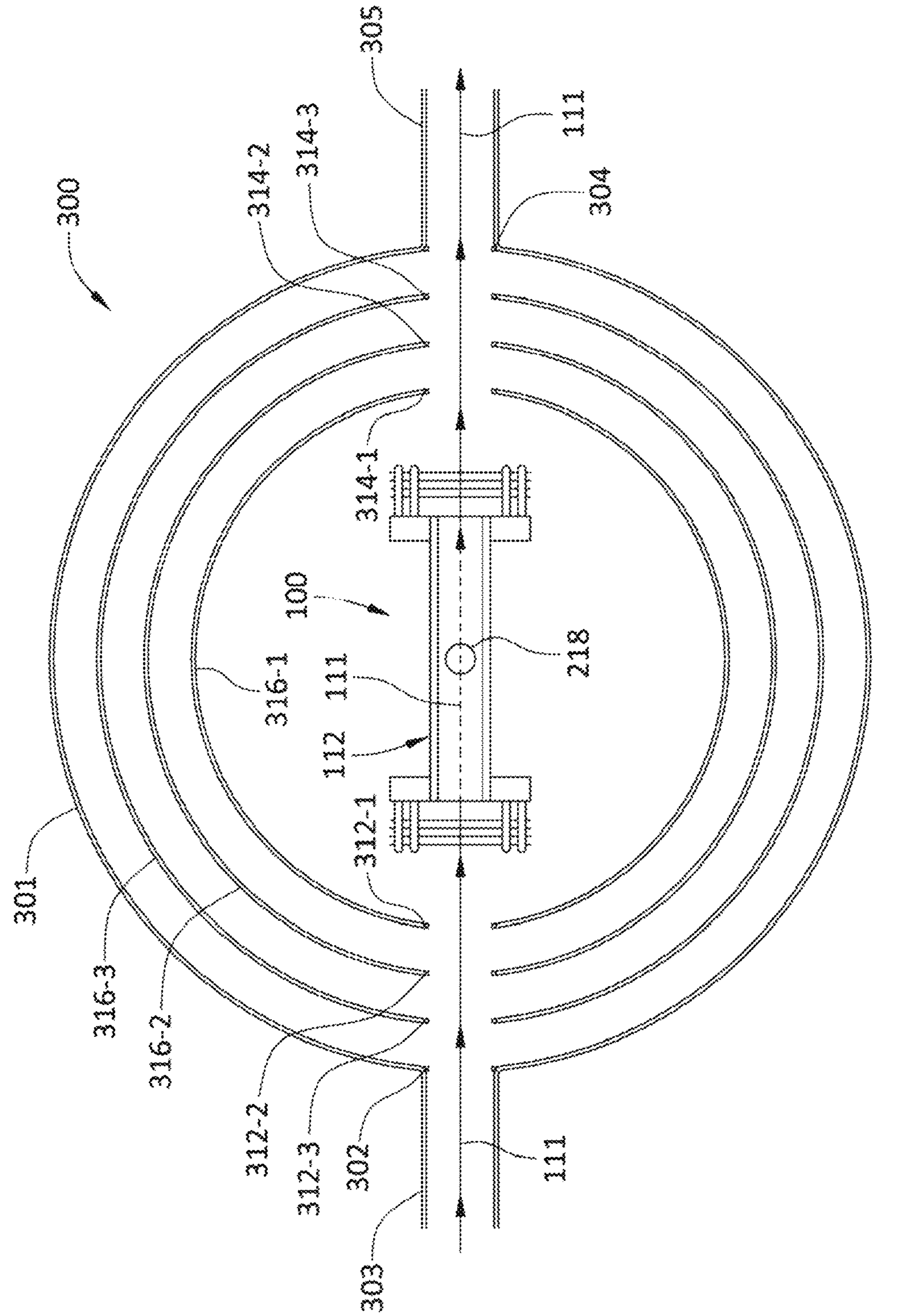
FIG. 3B is a partial cross-sectional view, orthogonal to the cross-sectional view of FIG. 3A, and block diagram of the example embodiment of the tandem accelerator of FIG. 3A.

FIG. 3A is a cross-sectional schematic diagram depicting an example embodiment of a tandem accelerator 300 including charge exchange system 100. FIG. 3B as a top down partial cross-sectional view of accelerator 300 taken along the beam path of FIG. 3A. In this embodiment, tandem accelerator 300 includes a housing 301 with an input 302 coupled with an input beam conduit 303 that receives a negative ion beam 111 (e.g., negative hydrogen ion (H−) beam or other ion beam) and an output 304 that outputs a positive ion beam (e.g., positive hydrogen ion (H+) beam or proton beam, or other ion beam) through output conduit 305.

Tandem accelerator 300 can include two or more input electrodes 312 that apply static voltages at different magnitudes designed to accelerate ion beam 111 from input 303 to charge exchange system 100. Accelerator 300 can include two or more output electrodes 314 that apply static voltages at different magnitudes designed to accelerate the now positive ion beam 111 from charge exchange system 112 towards output 305. In this embodiment accelerator 300 includes three input electrodes 312-1, 312-2, and 312-3 and three output electrodes 314-1, 314-2, and 314-3, although any number of two or more input electrodes and two or more output electrodes can be used. The number of input electrodes 312 may be the same or different than the number of output electrodes 314.

Tandem accelerator 300 can thus be configured to accelerate beam 111 in a first stage using input electrodes 312 and in a second stage using output electrodes 314. By reversing the polarity of beam 111 with charge exchange system 100, tandem accelerator 300 can utilize the same accelerating voltages in both input and output stages. For example, a sequence of progressively more positive voltages can be placed on each of the input electrodes 312, and that sequence of progressively more positive voltages can be reversed and placed on the output electrodes 314. For example, electrodes 312-1 and 314-1 can be placed at a first positive high-voltage, electrodes 312-2 and 314-2 can be placed at a second positive voltage that is relatively lower than the first voltage, and electrodes 312-3 and 314-3 can be placed in a third positive voltage that is relatively lower than the second voltage. Thus, the increasing positive gradient between negative beam 111 and input electrodes 312 acts to accelerate beam 111 from a relatively low energy to relatively higher energy and into charge exchange system 100, where beam 111 is converted into a positive beam. Positive beam 111 then encounters the decreasing positive gradient on output electrodes 314 that accelerates positive beam 111 to an even higher energy and out through output conduit 305.

The voltage of each input electrode 312 can be adjusted by a constant amount or a non-constant amount, and similarly for each output electrode 314. Each electrode 312 and 314 can be supplied by its own voltage source (e.g., an embodiment with two input electrodes and two output electrodes can have four voltage sources), or a single voltage source can apply a single high voltage to the highest voltage electrodes 312-1 and 314-1 and that voltage can be divided down (e.g., by network of resistors or insulators) at each successive pair of electrodes, e.g., 312-2 and 314-2, followed by 312-3 and 314-3, etc. Those of ordinary skill in the art, after reading this description, will readily recognize the various manners in which voltage can be applied to the electrodes of accelerator 300, and thus corresponding voltage sources and circuitry for such is omitted for ease of illustration.

Each pair of input and output electrodes (e.g., the 312-1 and 314-1 pair, etc.) can be coupled with or provided by a common substrate. In some embodiments, each common substrate can be a conductive chamber (or shell member) 316 of a different size, and the conductive chambers can be combined in a nested arrangement as shown in FIGS. 3A and 3B. Each chamber 316 may contain one electrode from the plurality of input electrodes and one electrode from the plurality of output electrodes. The highest voltage can be placed on the innermost input electrode 312-1 and output electrode 314-1, and thus the innermost nested chamber 316-1 can be referred to as the high-voltage chamber.

In the embodiment of FIGS. 3A and 3B, accelerator 300 includes four nested chambers 316-1, 316-2, 316-3, and a fourth provided by housing 301. Electrodes 312-1 and 314-1 are located on innermost chamber 316-1, electrodes 312-2 and 314-2 are located on a relatively larger chamber 316-2, electrodes 312-3 and 314-3 are located on a chamber 316-3 that is relatively larger than chamber 316-2, and input 302 and output 304 are provided on housing 301, which contains the other three chambers. Housing 301, input 302, and output 304, can be placed at a neutral or ground potential. As can be seen in FIG. 3B, each nested chamber can have a circular cross-sectional shape. Other shapes can be used as well, including but not limited to elliptical, polygonal, and others.

Referring back to FIG. 3A, gas conduit 220 extends through chambers 316 and can provide gaseous medium 114 to charge exchange system 100, specifically to the interior of tubular structure 210. The gas pumping system and supply containers connected to conduit 220 are not shown. To reduce the chance of arcing between electrodes and/or chambers, accelerator 300 can be kept at a low gas pressure (e.g., near-vacuum or vacuum). Gaseous medium 114 moves from the relatively high pressure within lumen 212 to the relatively low pressure within interior space 326 of innermost chamber 316-1. From here gaseous medium 114 can be removed or withdrawn by a vacuum pump (not shown) connected to gas conduit 328. The negative differential pressure draws gaseous medium 114 through open gratings 317-1, 317-2, and 317-3 in each of chambers 316-1, 316-2, and 316-3, respectively. Each of gas conduits 220 and 328 are shown with a valve, however the location of these valves can be changed and other valves can be included as desired.

Figure 4A:
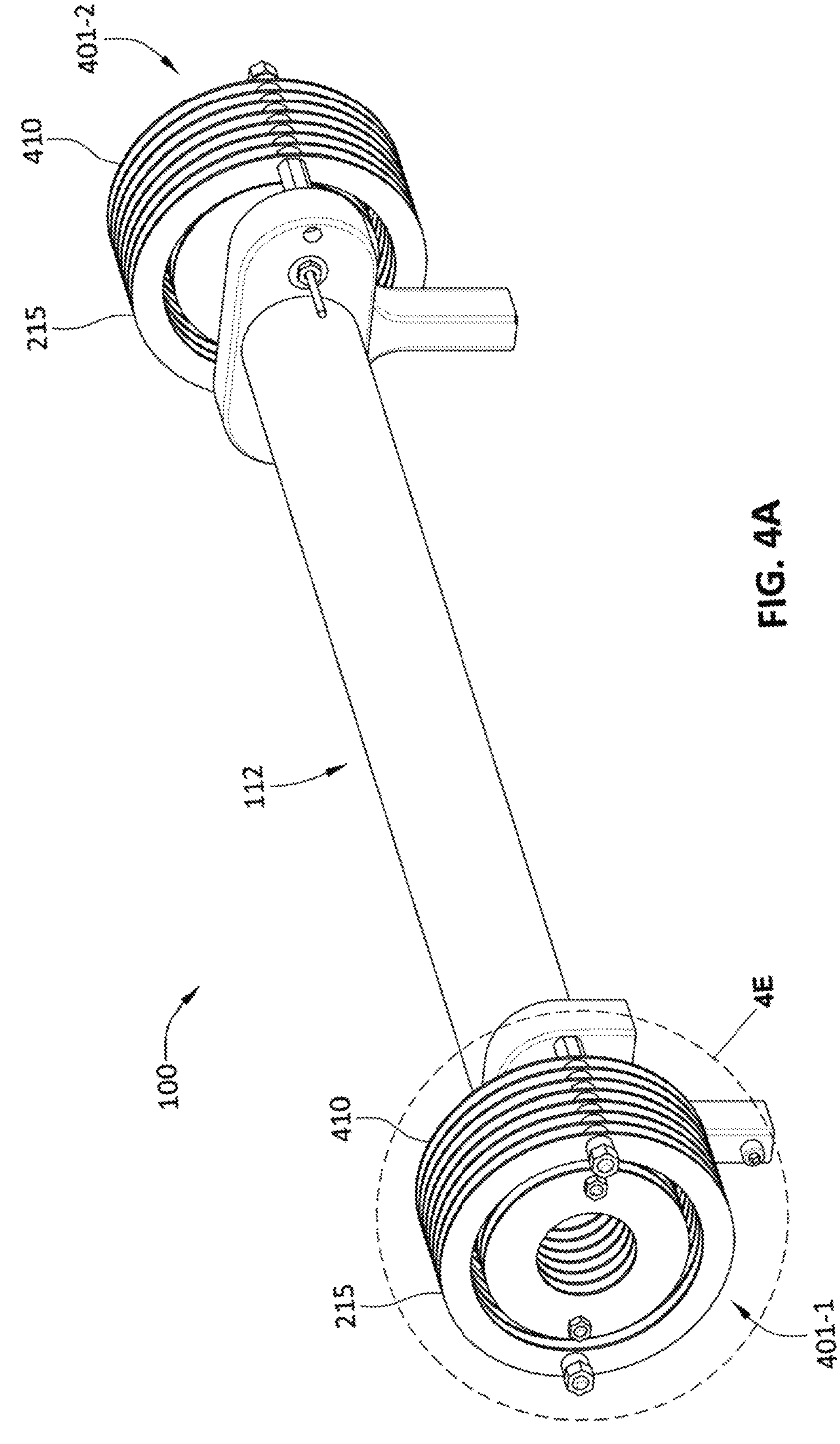
FIG. 4A is a perspective view of an example embodiment of a charge exchange system.
Figure 4B:
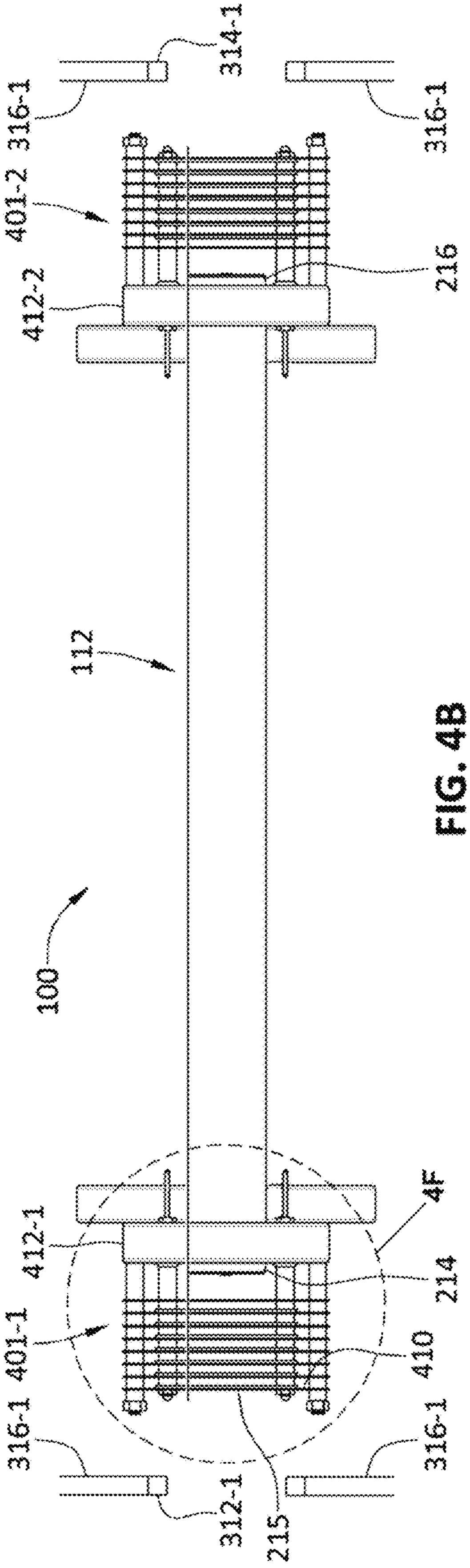
FIG. 4B is a top-down view of the embodiment of the charge exchange system of FIG. 4A.
Figure 4C:
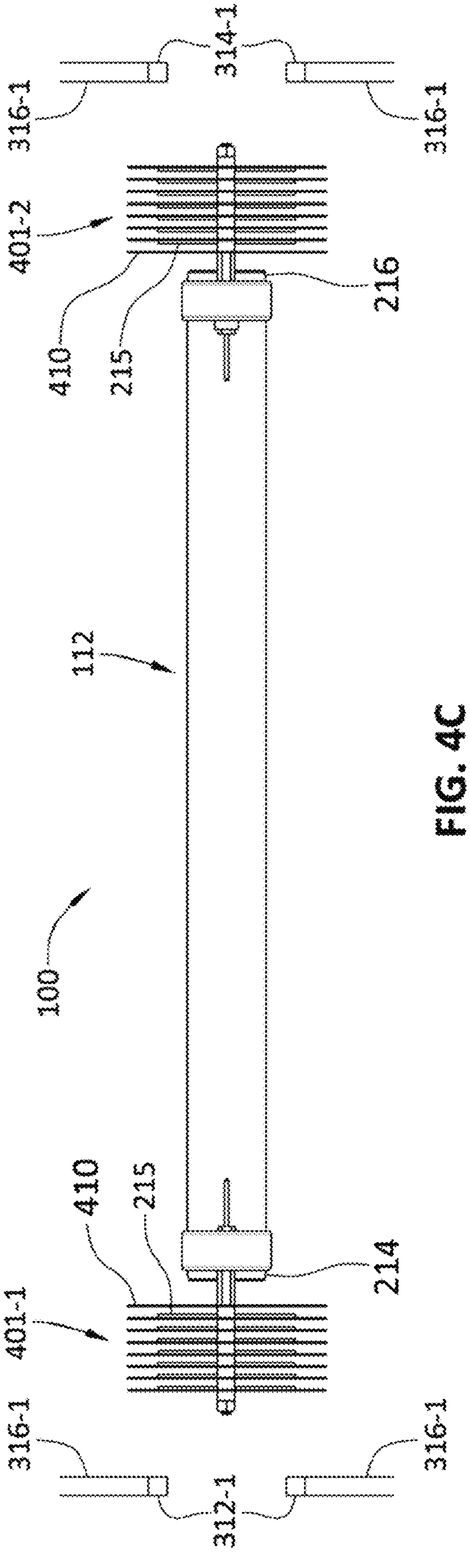
FIG. 4C is a side view of the embodiment of the charge exchange system of FIG. 4A.
Figure 4D:
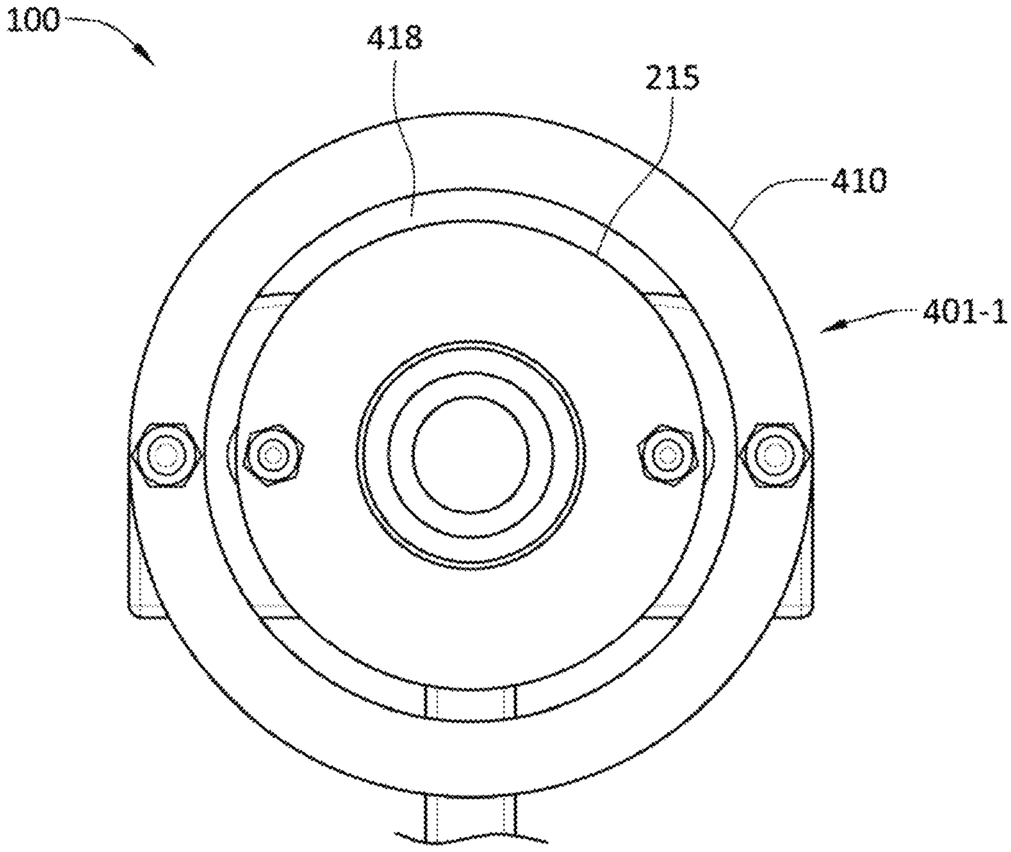
FIG. 4D is an end on view of the embodiment of the charge exchange system of FIG. 4A.
Figure 4E:
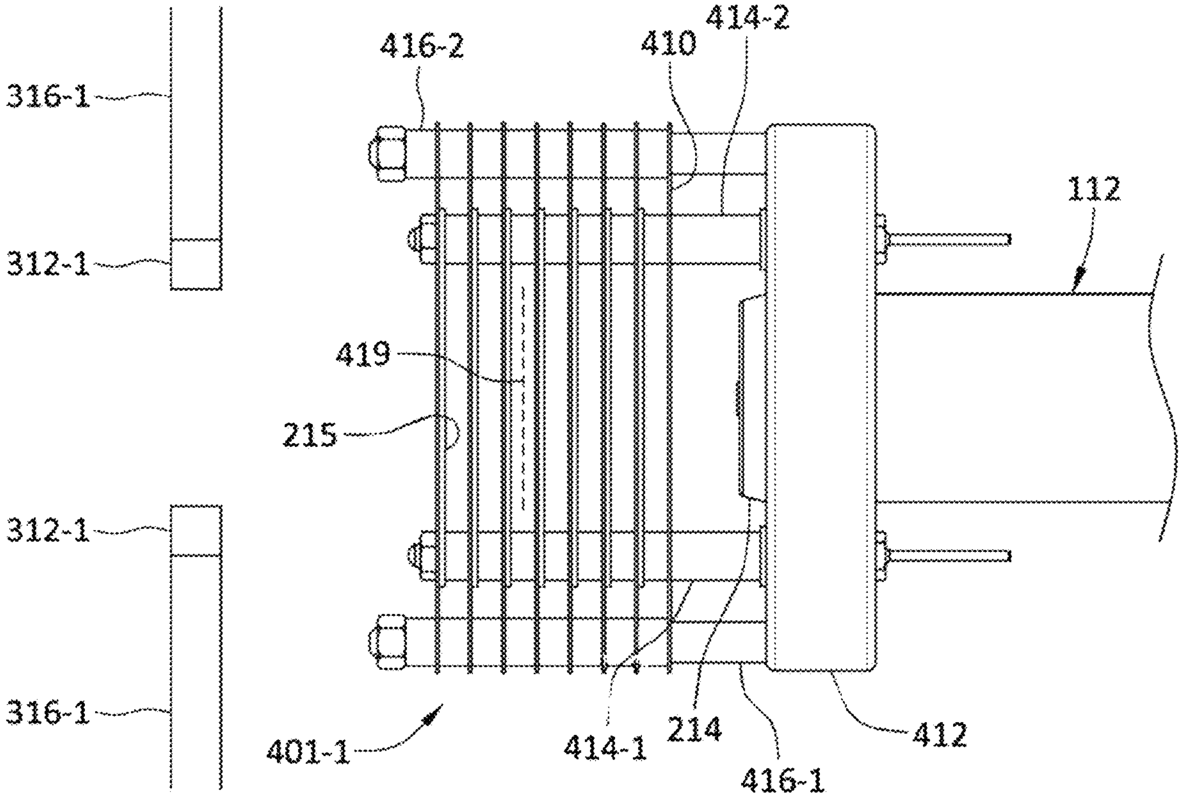
FIG. 4E is a close-up view of region 4E of FIG. 4A.
Figure 4F:
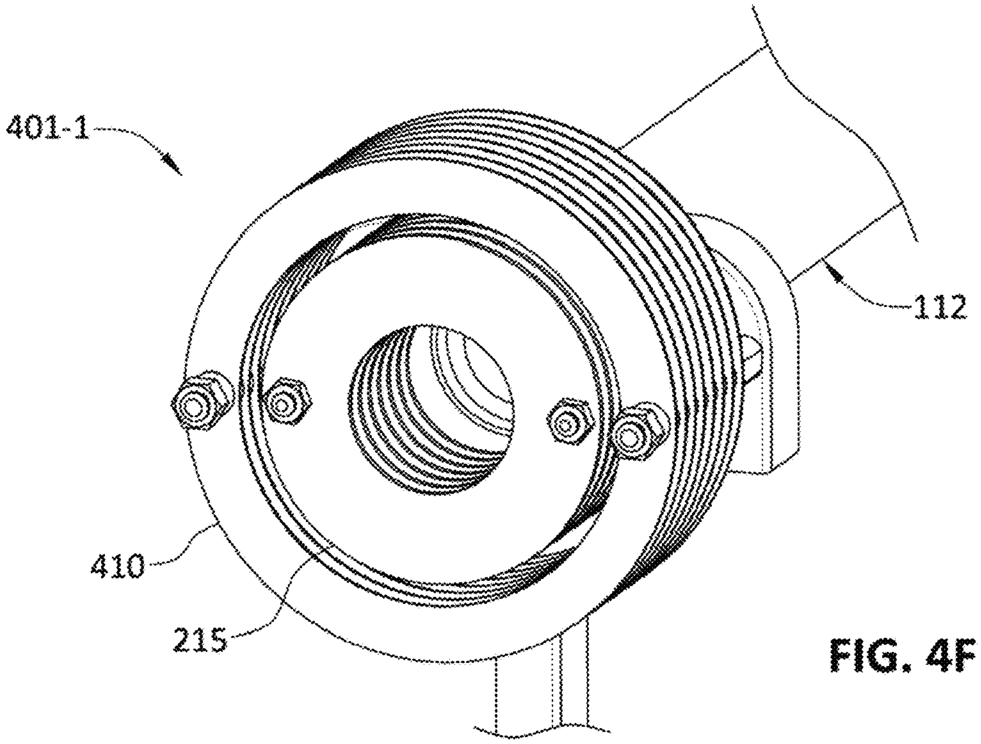
FIG. 4F is a close-up view of region 4F of FIG. 4B.

FIGS. 4A-4E depict an example embodiment of a charge exchange system 100 suitable for use within tandem accelerator 300. FIG. 4A is a perspective view, FIG. 4B is a top-down view, FIG. 4C is a side view, and FIG. 4D is an end on view of this embodiment. FIG. 4E is a close-up view of region 4E of FIG. 4A and FIG. 4F is a close-up view of region 4F of FIG. 4B. Also depicted in FIGS. 4B, 4C, and 4E is innermost chamber 316-1 with input electrode 312-1 and output electrode 314-1 of accelerator 300. For ease of illustration, charge exchange system 100 is depicted without the mechanical supports, cooling system, gas supply system, and other secondary components.

CXD 112 has a first guard apparatus 401-1 located adjacent inlet 214 and a second guard apparatus 401-2 located adjacent outlet 216. In this embodiment, the configuration of each guard apparatus 401-1 and 401-2 is the same, but in other embodiments each guard apparatus can be configured differently (such as with different numbers of electrodes, different potentials, different sizes and spacings, and the like).

Guard apparatus 401 can include any number of one or more guard (or attractor) electrodes 215 and any number of one or more screen electrodes 410. Within guard apparatus 401, the number of attractor electrodes 215 can be the same as or different from the number of screen electrodes 410. In the example shown here, each guard apparatus 401 includes six guard electrodes 215 and seven screen electrodes 410. A base 412 can extend laterally outwards from CXD 112 at each end of CXD 112. One or more supports 414 can be secured to base 412 and used to support attractor electrodes 215 and one or more supports 416 can be secured to base 412 and used to support screen electrodes 410. In this embodiment (see FIG. 4E), each guard apparatus 401 has a first support 414-1 and a second support 414-2 that are positioned at opposite sides of base 412, extend longitudinally away from base 412, and couple with each of the attractor electrodes 215. Similarly, each guard apparatus 401 has a first support 416-1 and a second support 416-2 that are positioned at opposite sides of base 412, extend longitudinally away from base 412, and couple with each of the screen electrodes 410.

Electrodes 215 and 410 can be configured with various shapes and dimensions and can be positioned in various relationships with respect to each other. In this embodiment, attractor electrodes 215 each have the shape of a disk or ring with a circular outer circumference and an inner aperture having an inner circular circumference. The inner aperture of each attractor electrode 215 is sized to permit the passage of beam 111 therethrough. In this embodiment, screen electrodes 410 each have the shape of a disk or ring with a circular outer circumference and an inner aperture having an inner circular circumference. The inner aperture of each screen electrode 410 is large enough to allow attractor electrodes 215 to be inset within the group of screen electrodes 410, such that a gap 418 (FIG. 4D) is present between the outer circumference of attractor electrodes 215 and the inner circumference of screen electrodes 410. The size of gap 418 is preferably large enough to prevent discharge between screen electrodes 410 and attractor electrodes 215 when placed at different potentials.

As best seen in FIG. 4E, the spacings between each attractor electrode 215 are constant as are the spacings between each screen electrode 410. Each attractor electrode 215 can be aligned with each screen electrode 410, such that each attractor electrode 215 resides directly within the inner circumference of each screen electrode 410, setting aside differences in thickness between electrodes 215 and 410. In the embodiment shown here, each attractor electrode 215 is slightly offset from each screen electrode 410. In other embodiments, each attractor electrode 215 can be offset further, e.g., such that it resides equidistant from each adjacent screen electrode as indicated by dashed line 419.

In addition to supplying mechanical support, supports 414 and 416 can also supply voltage to electrodes 215 and 410. Each attractor electrode 215 can have the same or different potential from each other attractor electrode 215. In this embodiment, each attractor electrode 215 has the same potential applied by a conductive core (not shown) of supports 414 that is in contact with each electrode 215. Similarly, each screen electrode 410 can have the same or different potential from each other screen electrode 410. In this embodiment, each screen electrode 410 has the same potential applied by a conductive core (not shown) of supports 416 that is in contact with each electrode 410. Supports 414 and 416 can each have an insulative exterior member or jacket surrounding the conductive cores.

Attractor electrodes 215 can be biased negatively or positively with respect to tubular structure 210 (FIG. 4D). In this embodiment, attractor electrodes 215 are biased negatively with respect to tubular structure 210 to collect ions from the plasma coming out of CXD 112. Tubular structure 210 can be placed at a high positive voltage, such as the voltage of electrodes 312-1 and 314-1. Although the actual voltage applied to electrodes 215 will vary depending upon the particular implementation, by way of example a biasing voltage can be applied such that each attractor electrode 215 has the same or a different potential in the range of negative 30 volts (V) up to and including negative 1000 V, or in some embodiments negative 100 V up to and including negative 500 V (measured with respect to ground, e.g., housing 301). Screen electrodes 410 reduce or eliminate any perturbations of the local electric field caused by the electric field of attractor electrodes 215 and thus can all be at a potential of CXD 112. Screen electrodes 410 can also prevent interaction of attractor electrodes 215 with charged particles that may present within interior space 326 of tandem accelerator 300.

Here, a negative potential applied to attractor electrodes 215 repels the electrons coming out of the secondary ion plasma expanding from within tubular structure 210. This effectively results in slower plasma expansion. Positive particles (e.g., protons or ions) are attracted by the negatively biased attractor electrodes 215. As those of ordinary skill in the art will realize based on this description, the dimensions and position of guard electrodes 215 can be selected to collect maximal possible current of the positive particles.

Positive particles that are not collected by the attractor electrodes 215 are deflected by the electric field and collected by the adjacent (innermost) electrode of accelerator 300. This is input electrode 312-1 on innermost chamber 316-1 for guard apparatus 401-1 (see FIGS. 4B, 4C, and 4E), and output electrode 314-1 on innermost chamber 316-1 (see FIGS. 4B-4C). This effect prevents formation of an energetic flow of secondary ions from the output of accelerator 300. Electrons of the CXD plasma are confined electrostatically by the applied electric field and by the self-produced electric field of the plasma bulk in tubular structure 210. The total current of secondary ions is limited and does not lead to substantial heating of attractor electrodes 215.

In contrast to prior art approaches, the negative polarity of the bias voltage makes it possible to completely or substantially completely suppress secondary ions from CXD 112 at a low power consumption, e.g., less than or equal to 0.5 watts (W). Sectioning of attractor electrodes 215 and incorporation of screen electrodes 410 helps minimize perturbations of the main accelerating voltage of accelerator 300.

Figure 5:
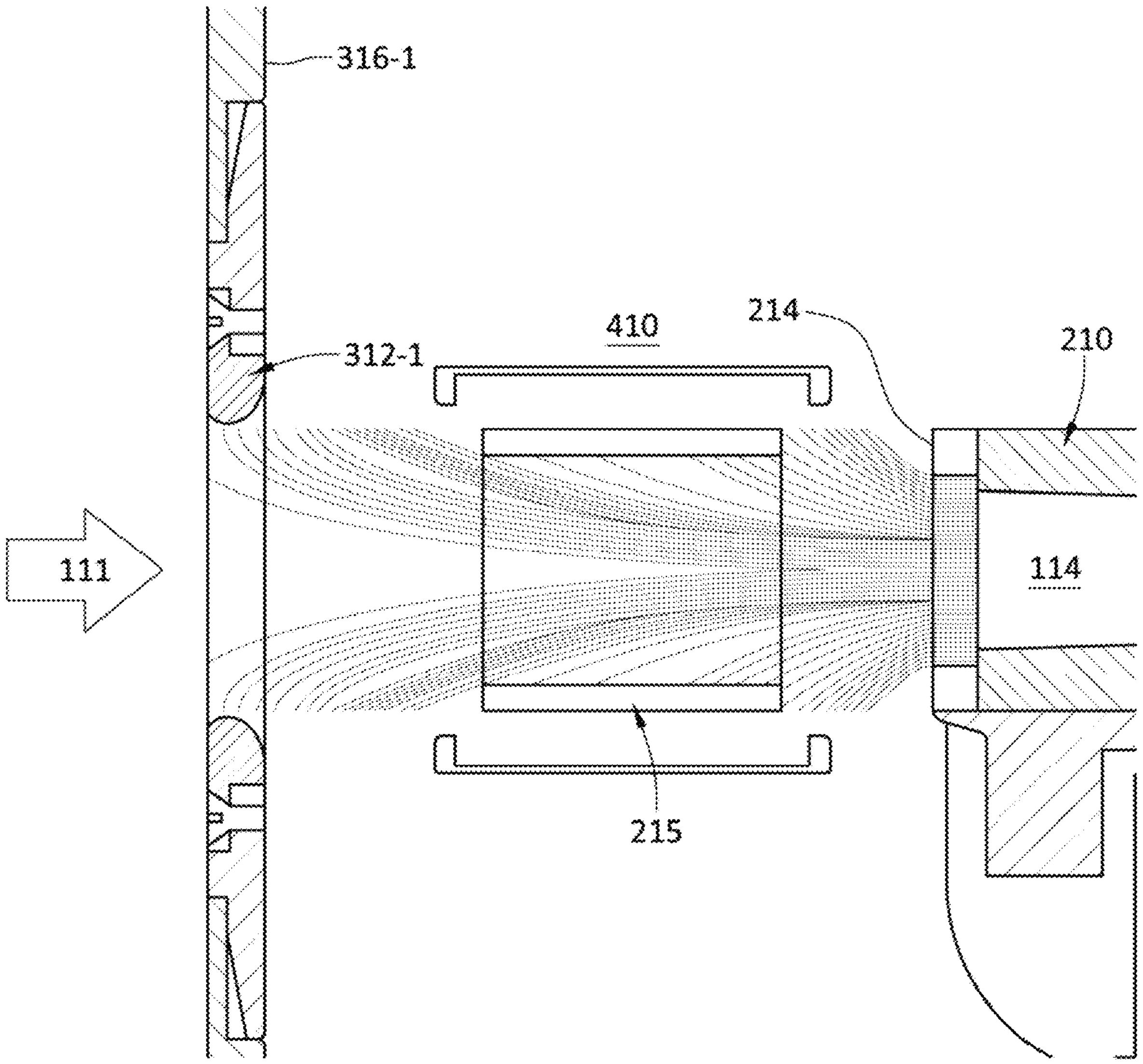
FIG. 5 is an illustration of a simulation of charged particle flow from the gaseous medium of an example embodiment of a charge exchange system.

An example simulation of the charged particle flow from the gaseous medium 114 of an example embodiment of charge exchange system 100 was carried out using PBGUNS software, and the results are shown in the cross-sectional view of FIG. 5. In this embodiment, the simulation was applied to an example embodiment of guard apparatus 401-1 on the input side of an embodiment of accelerator 300. Here, guard electrode 215 is a single cylindrical electrode, shown here in cross-section. Screen electrode 410 is also a single cylindrical electrode with an inwardly extending lip at both ends. In this example simulation, beam 111 is a negative hydrogen ion beam entering from the left, travelling through input electrode 312-1, and into tubular structure 210 of CXD 112, where gaseous medium 114 is Argon gas. The red curved lines in FIG. 5 show the trajectories of Ar+ ions. In this example simulation, attractor electrode 215 was biased at −500 V and 99% of the Ar+ ions were diverged from the beamline axis. For instance, some Ar+ ions were collected by attractor electrode 215 whereas others would be deflected from the beamline axis and strike the biased input electrode 312-1.

Figure 6A:
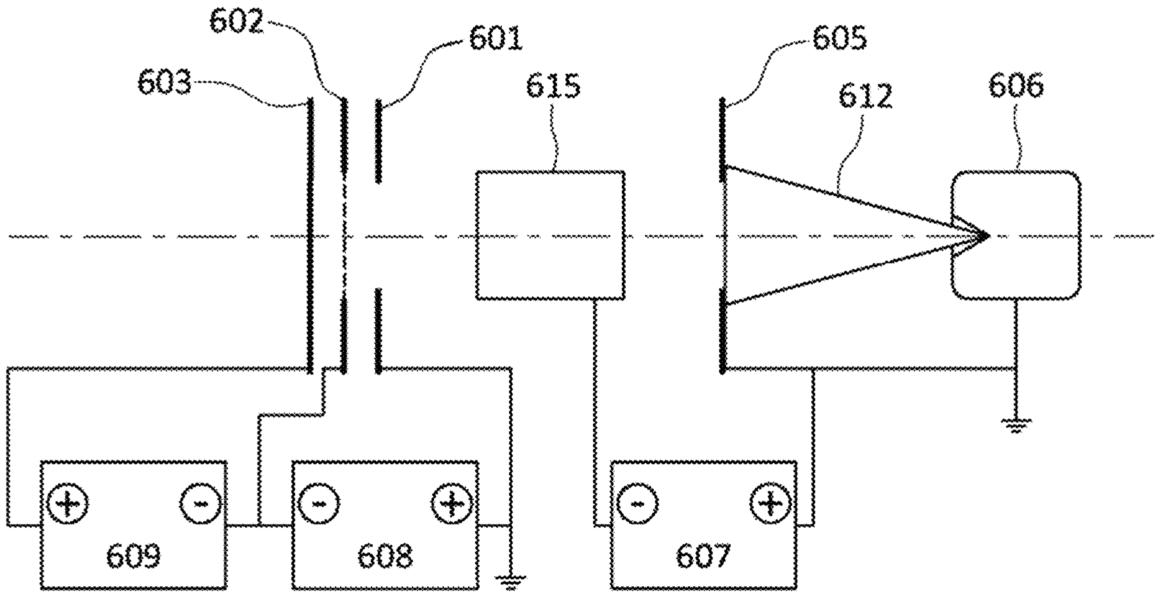
FIG. 6A is a block diagram depicting an example layout of an experimental set up for evaluating the operability of example embodiments described herein.
Figure 6B:
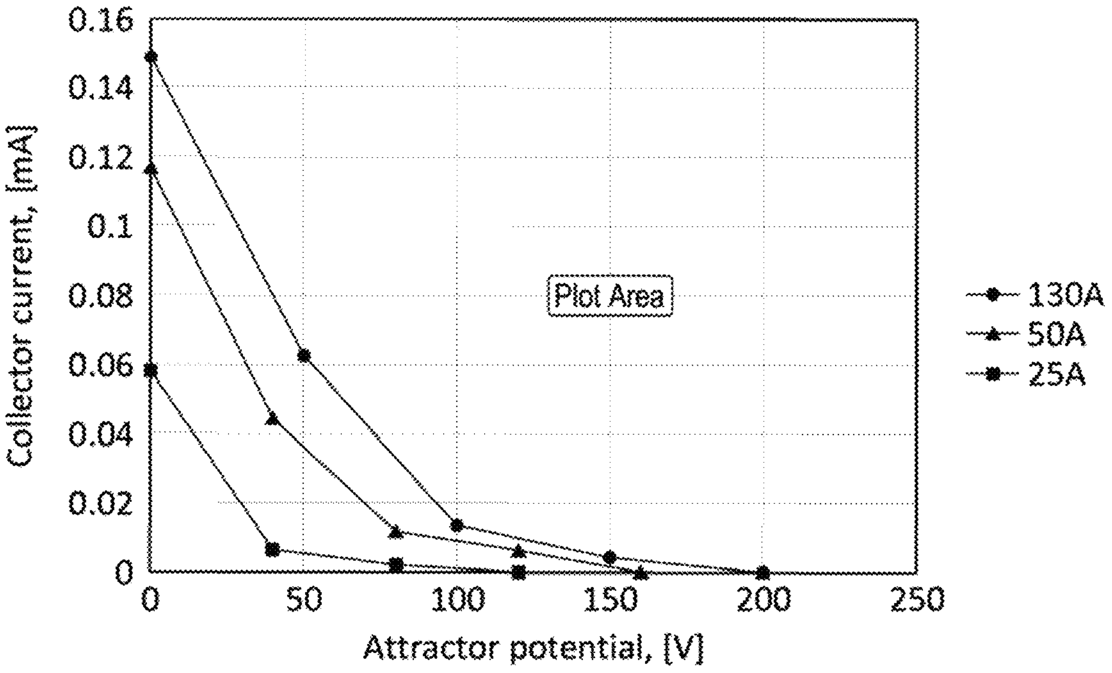
FIG. 6B is a graph of experimental results showing the dependence of the ion current on the attractor or guard electrode bias for different arc discharge currents.
Figure 6C:
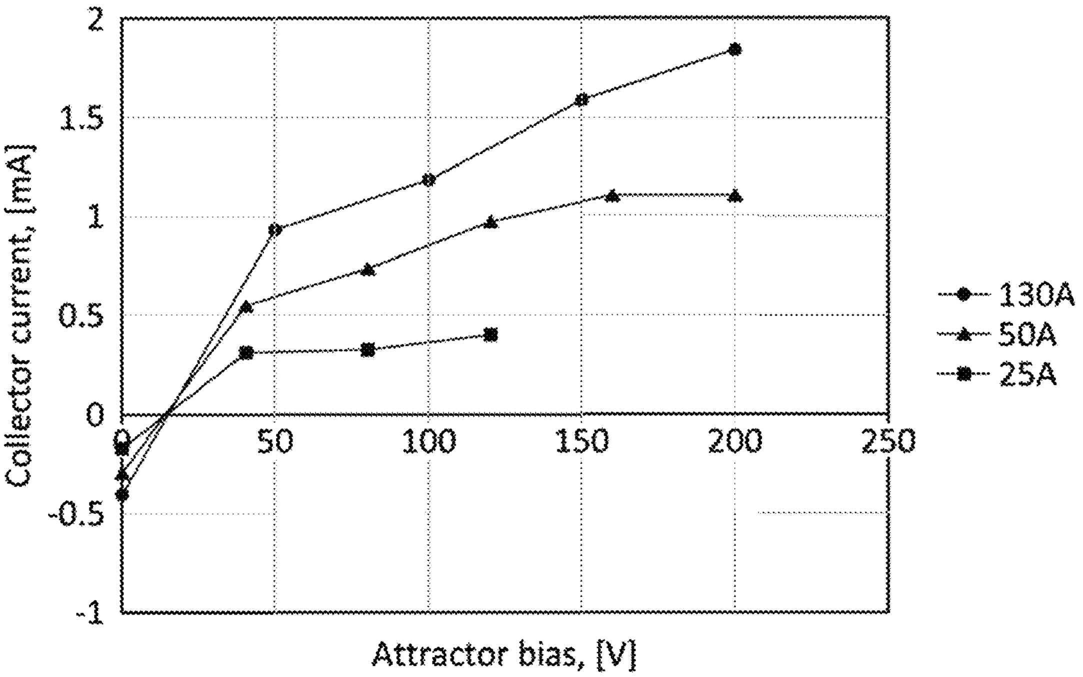
FIG. 6C is a graph of experimental results showing the Volt-Ampere characteristics of the attractor or guard electrode for different arc discharge currents.

Turning to FIGS. 6A-6C, a proof-of-concept experiment was carried out where an arc discharge was used to simulate the plasma flow from a gas-based charge exchange system like embodiments described herein. FIG. 6A is a block diagram depicting the layout of the experiment. Plasma 612 generated by an arc source 606 is shown in FIG. 6 as a cone. Expansion of the arc plasma 612 is limited by the aperture 605, which simulates the edge (e.g., inlet or outlet) of a charge exchange device. Plasma propagates towards the attractor electrode 615, which is biased negatively relative to the aperture 605. The bias potential is controlled by a power supply 607. While a portion of positive ions are lost on the wall of attractor electrode 615, the rest propagates further and reaches aperture 601, which represents the adjacent electrode of the tandem accelerator. A suppression grid 602 with a collector 603 are present behind aperture 601 to measure the ion current. The suppression grid 602 and the collector 603 are biased by power supplies 607 and 608, respectively, in order to collect Ar ions and to repel secondary electrons. All distances and aperture sizes were made to simulate a real geometry of the tandem accelerator.

FIGS. 6B-6C are graphs depicting experimental results obtained using the layout shown in FIG. 6A. FIG. 6B presents ion current measured on the collector 603 (milliamps) as a function of bias potential of attractor electrode 615 (volts) for three levels of the arc discharge current (amps). As can be seen here, the collector current is relatively high with a relatively low bias potential applied to attractor electrode 615. Higher biasing potential is needed to suppress expansion of the Ar ions from the denser plasma. At an arc discharge current of 25 amps (A), which corresponds to the plasma density similar to conditions described in V. I. Davydenko, et al., "Stripping target of 2.5 MeV 10 mA tandem accelerator," in *AIP Conference Proceedings*, 2005, vol. 763, pp. 332-336, a bias potential of 100-120 V bias was sufficient to achieve zero ion current at collector 603.

FIG. 6C presents the Volt-Ampere characteristics of the attractor or guard electrode for different arc discharge currents. For 25 A arc current, the attractor electrode current at −100 V bias is below 0.5 mA, which corresponds to a power consumption of 0.5 W. These measurements confirm that negative polarity of the attractor electrode bias results in efficient suppression of the ions coming from the CXD. As a result, the incoming thermal flux on the attractor electrode surface is also low and can be safely dissipated.

Figure 7A:
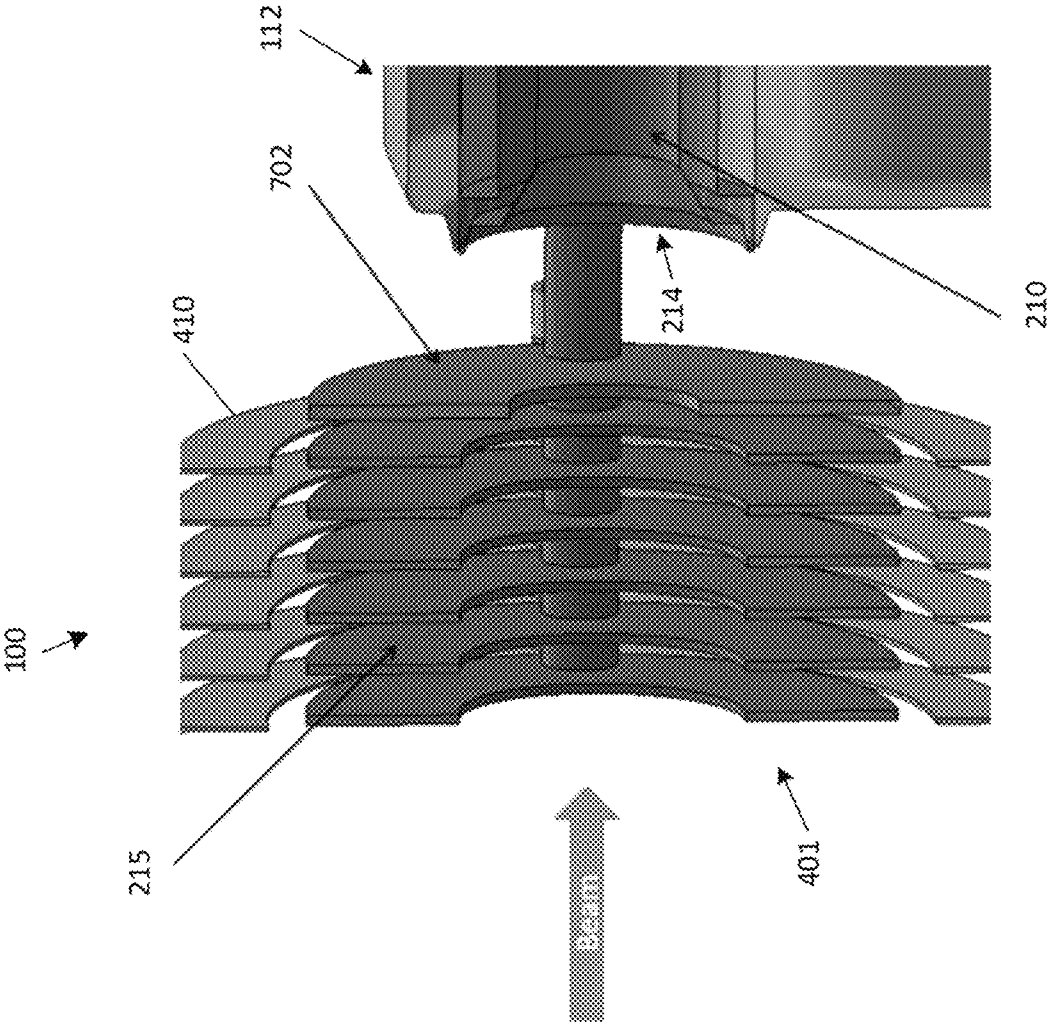
FIG. 7A is a partial cross-sectional view depicting an example embodiment of a charge exchange system with an aperture structure between the guard apparatus and charge exchange device.

System 100 can include an aperture structure configured to act as a physical barrier between the beam source and CXD 112 (e.g., a beam scraper). FIG. 7A is a partial cross-section view depicting an example embodiment of system 100 having such an aperture structure 702. Aperture structure 702 can be part of guard apparatus 401 and positioned in spaced relation to beam inlet 214 as shown here. An inner opening 704 of structure 702 can be sized to permit substantially unimpeded passage of the beam when properly aligned with CXD 112. Structure 702 can be configured to shield CXD 112 and other sensitive components in the case of beam alignment deviation. In an example application where the beam may become misaligned, deviation of the beam from proper alignment can result in partial (or entire) incidence of the beam on aperture structure 702 such that structure 702 absorbs the beam energy and damage to CXD 112 is prevented and/or minimized. The width (e.g., diameter) of inner opening 704 can be equal to or less than the width of the open beam inlet 214 of CXD 112, and/or less than the width of the interior space of tubular structure 210. The width of inner opening 704 can also be less than the width of the inner openings of screen electrodes 410, as shown here.

In some example embodiments, aperture structure 702 can be electrically biased in order to provide additional ion suppression. Also, or alternatively, aperture structure 702 can be electrically biased (negative or positive) and connected to current sensor circuitry configured to monitor current passing through aperture structure 702. An increase in current, or a current level that exceeds a predetermined threshold, can result from beam incidence on structure 702 and indicate variation in beam alignment, size, and/or shape. Larger current deviation can correspond to a greater degree of variation in alignment, size, and/or shape. Current variations can also indicate variation in beam current or gas discharge within CXD 112.

System 100 can be configured to monitor this current in real time and take an action (e.g., via a control device) immediately in response to detection of increased current. These actions can include, for example, causing or instructing one or more of the following to occur: outputting an indication (e.g., visual, audible) of increased current or possible beam maladjustment (e.g., misalignment, oversizing, shape deviation, gas discharge variation) to an operator; taking a safety action or activating a safety mechanism; adjusting beam energy, bending, and/or steering to correct for maladjustment; correcting gas discharge rate; adjusting coolant flow to CXD 112; and/or deactivating one or more components of system 100 (e.g., accelerator, ion source, etc.) to cease beam propagation through CXD 112.

Positioning of aperture structure 702 within the accelerator, in close proximity to CXD 112, enables more accurate detection of beam misalignment as compared to misalignment detection devices located at a greater distance further upstream or downstream, which need to rely on assumptions about changing conditions within the accelerator and near CXD 112.

In some example embodiments, structure 702 can be electrically insulated from the adjacent components, e.g., guard apparatuses 401, CXD 112, and the accelerator) and structure 702 can be independently and controllably biased (e.g., with a variable voltage supply) to the desired voltage regardless of the bias applied to the adjacent components. This allows greater controllability for current monitoring and/or ion suppression. In some examples structure 702 can be placed at the same bias voltage as screen electrodes 410 of the adjacent apparatus 401.

Aperture structure 702 can be spaced away from open beam inlet 214 as shown, or can be affixed to CXD 112 such that it forms the beam inlet 214. Aperture structure 702 can be configured like a screen electrode 410, or positioned within the array of screen electrodes 410. Aperture structure 702 can be positioned in proximity with beam outlet 216 for performing the same functions on the opposite downstream side of CXD 112, as an alternative to or in addition to, placement on the upstream inlet side. Any structure 702 on the opposite side of CXD 112 can be connected to a separate power supply for independently and controllably biasing the downstream structure 702

As with electrodes 215 and 410, aperture structure 702 can be configured with different shapes on its outer periphery and inner opening periphery. Structure 702 can be configured as a plate with an inner opening, e.g., such as a ring. The material(s) forming aperture structure 702 should have sufficiently high melting temperature as to prevent failure by overheating and melting. Refractory metals typically have a high melting point and beneficial plasma characteristics for vacuum, sputtering, and outgassing. Examples of such materials include molybdenum, tungsten, tantalum, and alloys thereof (e.g., titanium-zirconium-molybdenum (TZM)).

Aperture structure 702 need not surround the beam in all embodiments. Multiple aperture structures 702 can be arranged on one side of CXD 112, in an array like fashion similar to screen electrodes 410 of guard apparatus 401. If an array is used, structures 702 can be arranged as an electrically connected group, or as a group of electrically isolated structures 702 to allow for unique current measurements at different locations.

As described earlier, charge exchange system 100 can be used in numerous different applications and with various types of accelerators. Charge exchange system 100 is described with respect to a tandem accelerator 300 in FIGS. 3A and 3B, and this tandem accelerator 300 can be used in numerous different applications. One example application is in a neutron beam system for generation of a neutron beam for use in boron neutron capture therapy (BNCT).

CXD 112 can also be configured to be independently and controllably biased to add further diagnostic and particle suppression capability to system 100. CXD 112 can be connected to a separate power supply and electrically isolated from the other components of and within the accelerator (e.g., guard apparatus 401, aperture structure 702, input and output acceleration electrodes). Such a configuration enables CXD 112 to collect secondary particles generated through the charge exchange process, and/or monitor the amount of current passing through CXD 112. As with the current monitored by aperture structure 702, changes in current can be indicative of beam maladjustment or gas discharge variation, and system 100 can be configured to monitor this current in real time and take an action (e.g., via a control device) immediately in response to detection of increased current. These actions can include, for example, causing or instructing one or more of the following to occur: outputting an indication (e.g., visual, audible) of increased current or possible beam maladjustment (e.g., misalignment, oversizing, shape deviation, gas discharge variation) to an operator; taking a safety action or activating a safety mechanism; adjusting beam energy, bending, and/or steering to correct for maladjustment; correcting gas discharge rate; adjusting coolant flow to CXD 112; and/or deactivating one or more components of system 100 (e.g., accelerator, ion source, etc.) to cease beam propagation through CXD 112.

Figure 7B:
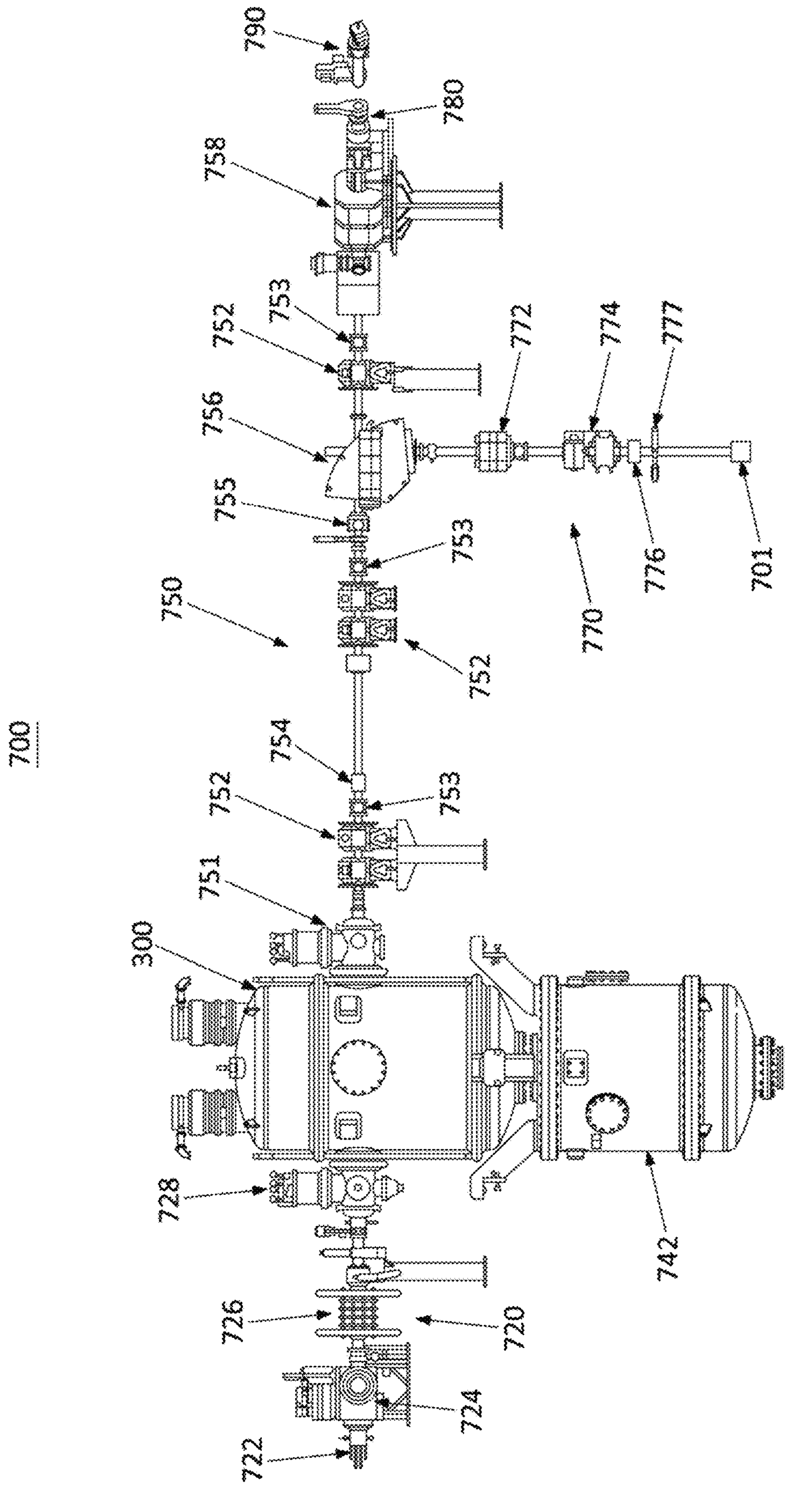
FIG. 7B is a schematic diagram of an example embodiment of a neutron beam system for use in boron neutron capture therapy (BNCT).

FIG. 7B depicts an example embodiment of a neutron beam system 700 for use in BNCT. In this embodiment, system 700 includes a low energy beamline, serving as an ion beam injector 720, a high voltage (HV) tandem accelerator 300 coupled to ion beam injector 720, and a high-energy beamline 750 extending from tandem accelerator 300 to a neutron target assembly 701 housing a neutron-producing target. Ion beam injector 720 can include an ion source 722, an ion source vacuum box 724, which is extending from ion source 722, a pre-accelerator 726 coupled to ion source vacuum box 724 and a pumping chamber (with a built-in Faraday cup) 728 coupled to pre-accelerator 726 and tandem accelerator 300. Ion source 722 can serve as a source of charged particles (e.g., negative hydrogen ions) which can be accelerated, conditioned and eventually used to produce neutrons when delivered as a proton beam to the neutron producing target surface (e.g., that includes lithium or beryllium) of target assembly 701.

At least two types of negative ion sources 722 can be used in system 700, which differ by the mechanism of generation of negative ions: a surface type and a volume type. A surface type possesses cesium (Cs) on specific internal surfaces. A discussion of an example surface type negative ion source is provided in published PCT Application No. WO 2014/039579 A2, which is incorporated herein by reference for all purposes. A volume type relies on formation of negative ions in the volume of a high current discharge plasma. Both types of ion sources can deliver the required negative ion current for system 700.

Ion source vacuum box 724, pre-accelerator 726 and pumping chamber 728 together form a low energy beamline extending from ion source 722 to tandem accelerator 300. These devices are configured to transfer the ion beam from ion source 722 to the input of tandem accelerator 300. This low energy beamline may have a few ion optics elements to focus and steer the beam to match the beam to the beamline axis and the acceptance angle of tandem accelerator 300. Ion vacuum box 724 may have another ion optics positioned therein.

Pre-accelerator 726 provides acceleration of the negative ion beam injected from ion source 722. Pre-accelerator 726 serves the function of beam focusing to achieve overall convergence to match aperture area at the inlet to tandem accelerator 300. There may be at least 2, alternatively at least 3, alternatively at least 4, alternatively at least 5, alternatively at least 6, or alternatively at least 7, and so forth, input electrodes 312 that are biased at progressively more positive voltages with the input electrode closest to charge exchange system 100 (including guard apparatuses 401) being biased at the highest positive voltage of the plurality of input electrodes 312. There may be at least 2, alternatively at least 3, alternatively at least 4, alternatively at least 5, alternatively at least 6, or alternatively at least 7, and so forth, output electrodes 314 that are biased at progressively less positive voltages with the output electrode closest to charge exchange system 100 (including one or more guard apparatuses 401) being biased at the highest positive voltage of the plurality of output electrodes 314.

In some embodiments of system 700 configured for use in BNCT, the potential of the highest voltage electrodes can be in the range of 950 kilovolts (kV) up to and including 1.5 megavolts (MV) to provide an accelerating voltage of between 1.9 megaelectronvolts (MeV) and 3.0 MeV. The change in voltage between adjacent input electrodes (or adjacent output electrodes) can be between 50 kV and 1500 kV, and in some embodiments between 100 kV and 250 kV. The voltage differential between adjacent input electrodes (or output electrodes) can be the same or different. These ranges are merely a non-limiting example as the voltages can and will vary based on the implementation, of which numerous differing examples are set forth herein.

In this embodiment, tandem accelerator 300, which is powered by a high voltage power supply 742 coupled thereto, accelerates a proton beam to an energy equal to twice the voltage applied to the accelerating electrodes positioned within tandem accelerator 300. The energy level of the proton beam is achieved by accelerating the beam of negative hydrogen ions from the input of tandem accelerator 300 to the innermost high-potential electrode 312, stripping two electrons from each ion with charge exchange system 100 (including one or more guard apparatuses 401), and then accelerating the resulting protons downstream by the same applied voltage(s).

High-energy beamline 750 transfers the proton beam from the output of tandem accelerator 300 to the neutron-generating target in neutron target assembly 701 positioned at the end of a branch 70 of the beamline extending into a patient treatment room. In the example embodiment shown in FIG. 7, high-energy beamline 750 includes three branches 770, 780 and 790 to extend into three different patient treatment rooms. High-energy beamline 750 includes a pumping chamber 751, quadrupole magnets 752 and 772 to prevent de-focusing of the beam, dipole or bending magnets 756 and 758 to steer the beam into treatment rooms, beam correctors 753, diagnostics such as current monitors 754 and 776, fast beam position monitor 755, and a scanning magnet 774.

The configuration of high-energy beamline 750 depends on the configuration of the treatment facility. The embodiment shown on FIG. 7 implements a two-story configuration of the treatment facility. One of the treatment rooms, which is closer to target assembly 701 is located on the lower story. The beam is delivered to this target assembly 701 with the use of the bending magnet 756. After that, quadrupole magnets 772 focus the beam to the certain size at the target. Then, the beam enters scanning magnets 774, which provides rastering of the beam onto the target surface of assembly 701 in, e.g., a spiral, up and down, or side to side motion manner. The target surface preferably contains lithium or beryllium and produces neutrons when impacted by the proton beam. Beam rastering assists in achieving smooth and even time-averaged distribution of the proton beam on the lithium target, mitigating overheating and making the neutron generation more uniform within the target surface.

After entering the scanning magnets 774, the beam is delivered into a current monitor 776, which measures beam current that can be used for various purposes, such as in a safety interlock. Target assembly 701 can be physically separated from the high energy beamline volume with a gate valve 777. The main function of the gate valve is separation of the vacuum volume of the beamline from target assembly 701 while target removal or loading. The horizontal orientation of the beamline (second and possibly third treatment rooms off branches 780 and 790) is shown (partially) in FIG. 7 as well. In this case the beam is not bent by 90 degrees by a bending magnet 756, it rather goes straight to the right, then it enters the quadrupole magnets 752, which are located in the horizontal beamline. After, the beam could be bent by another bending magnet 758 to a needed angle, depending on the room configuration. Otherwise, the bending magnet 758 could be replaced with a Y-shaped magnet in order to split the beamline into two directions for two different treatment rooms located on the same floor.

Neutron beam system 700 can also be used for other applications, such as cargo inspection and others, and is not limited to BNCT.

Various aspects of the present subject matter are set forth below, in review of, and/or in supplementation to, the embodiments described thus far, with the emphasis here being on the interrelation and interchangeability of the following embodiments. In other words, an emphasis is on the fact that each feature of the embodiments can be combined with each and every other feature unless explicitly stated otherwise or logically implausible.

In many embodiments, a tandem accelerator is provided that includes: a plurality of input electrodes adapted to be biased at sequentially increasing positive voltages to accelerate a negative beam; a charge exchange device having a lumen fillable with a gas adapted to convert the negative beam to a positive beam; a plurality of output electrodes adapted to be biased at sequentially decreasing positive voltages to accelerate the positive beam away from the charge exchange device; and a first guard apparatus located between the charge exchange device and the plurality of input electrodes, wherein the first guard apparatus comprises a first guard electrode adapted to be negatively biased with respect to the charge exchange device.

In some embodiments, the first guard apparatus further includes a first screen electrode. The first screen electrode can be adapted to prevent perturbation of a local electric field of the charge exchange device by an electric field of the first guard electrode.

In some embodiments, the first guard electrode is ring-shaped and located at or proximate to an inlet of the charge exchange device.

In some embodiments, the tandem accelerator further includes a set of ring-shaped guard electrodes located at or proximate to an inlet of the charge exchange device.

In some embodiments, the first guard electrode is adapted to attract positive particles from the gas and repel negative particles.

In some embodiments, the first guard apparatus is located between the charge exchange device and an innermost one of the plurality of input electrodes, and the innermost one of the plurality of input electrodes is the input electrode closest in proximity to the charge exchange device. The innermost one of the plurality of input electrodes can be adapted to be positively biased with respect to the charge exchange device.

In some embodiments, the tandem accelerator further includes a plurality of nested chambers surrounding the charge exchange device, each chamber having at least one of the plurality of input electrodes or at least one of the plurality of output electrodes. The first guard apparatus can be located between the charge exchange device and an innermost one of the plurality of nested chambers.

In some embodiments, a biasing voltage of the first guard electrode is between about −30 V and −1000 V.

In some embodiments, the plurality of input electrodes are biased at voltage intervals of between about 50 kV and 1500 kV. In an example embodiment the plurality of input electrodes are biased at voltage intervals of between about 100 kV and 250 kV.

In some embodiments, the plurality of output electrodes are biased at voltage intervals of between about 50 kV and 1500 kV. In an example embodiment the plurality of output electrodes are biased at voltage intervals of between about 100 kV and 250 kV.

In some embodiments, the plurality of input electrodes has the same number of electrodes as the plurality of output electrodes.

In some embodiments, the tandem accelerator further includes a second guard apparatus located between the charge exchange device and the plurality of output electrodes. The second guard apparatus can include a second guard electrode adapted to be negatively biased with respect to the charge exchange device. The second guard apparatus can be located between the charge exchange device and an innermost one of the plurality of output electrodes, where the innermost one of the plurality of output electrodes is the output electrode closest in proximity to the charge exchange device. The second guard apparatus can further include a second screen electrode. The screen electrode can be adapted to prevent perturbation of a local electric field of the charge exchange device by an electric field of the second guard electrode. The second guard electrode can be ring-shaped and located at or proximate to an outlet of the charge exchange device. The second guard electrode can be adapted to attract positive particles from the gas and repel negative particles. The biasing voltage of the second guard electrode can be between about −30 V and −1000 V.

In some embodiments, the gas is Argon.

In many embodiments, a tandem accelerator is provided, that includes: a plurality of input electrodes adapted to be positively biased to accelerate a negative beam; a charge exchange device having a lumen fillable with a gas adapted to convert the negative beam to a positive beam; a plurality of output electrodes adapted to be negatively biased to accelerate the positive beam from the charge exchange device; and a first guard electrode adapted to be negatively biased and located between a first one of the plurality of input electrodes and the charge exchange device.

In some embodiments, the tandem accelerator further includes a first screen electrode. The first screen electrode can be adapted to prevent perturbation of a local electric field of the charge exchange device by an electric field of the first guard electrode.

In some embodiments, the first guard electrode is ring-shaped and located at or proximate to an inlet of the charge exchange device.

In some embodiments, the tandem accelerator further includes a set of ring-shaped guard electrodes located at or proximate to an inlet of the charge exchange device. The tandem accelerator can further include a set of ring-shaped screen electrodes. The set of ring-shaped guard electrodes can be located within the set of ring-shaped screen electrodes.

In some embodiments, the first guard electrode can be adapted to attract positive particles from the gas and repel negative particles.

In some embodiments, the first guard electrode can be located between the charge exchange device and an innermost one of the plurality of input electrodes, where the innermost one of the plurality of input electrodes is the input electrode closest in proximity to the charge exchange device. The first guard electrode can be adapted to be negatively biased with respect to the charge exchange device, and the innermost one of the plurality of input electrodes is adapted to be positively biased with respect to the charge exchange device. The tandem accelerator can further include one or more voltage sources adapted to supply a negative bias to the first guard electrode and a positive bias to the innermost one of the plurality of input electrodes.

In some embodiments, the tandem accelerator further includes a plurality of nested chambers surrounding the charge exchange device, each chamber having at least one of the plurality of input electrodes or at least one of the plurality of output electrodes. The first guard apparatus can be located between the charge exchange device and an innermost one of the plurality of nested chambers.

In some embodiments, the tandem accelerator further includes a voltage source adapted to apply a biasing voltage of the first guard electrode of between about −30 and −1000 V.

In some embodiments, the tandem accelerator further includes a voltage source adapted to bias the plurality of input electrodes and the plurality of output electrodes. The voltage source can be adapted to bias the highest voltage input and output electrodes at voltages of between about 950 kilovolts and 1500 kilovolts (1.5 megavolts).

In some embodiments, the plurality of input electrodes can have the same number of electrodes as the plurality of output electrodes.

In some embodiments, the tandem accelerator further includes a second guard electrode located between the charge exchange device and the plurality of output electrodes. The second guard electrode can be adapted to be negatively biased with respect to the charge exchange device. The second guard electrode can be located between the charge exchange device and an innermost one of the plurality of output electrodes, where the innermost one of the plurality of output electrodes is the output electrode closest in proximity to the charge exchange device.

In some embodiments, the tandem accelerator further includes a second screen electrode. The second screen electrode can be adapted to prevent perturbation of a local electric field of the charge exchange device by an electric field of the second guard electrode. The second guard electrode can be ring-shaped and located at or proximate to an outlet of the charge exchange device. The second guard electrode can be adapted to attract positive particles from the gas and repel negative particles. A biasing voltage of the second guard electrode can be between about −30 and −1000 V.

In many embodiments, a neutron beam system is provided that includes: a tandem accelerator comprising a plurality of input electrodes adapted to be sequentially increasingly positively biased to accelerate a negative beam from an inlet, a charge exchange device having a lumen fillable with a gas adapted to convert the negative beam to a positive beam, a plurality of output electrodes adapted to be sequentially decreasingly positively biased to accelerate the positive beam from the charge exchange device to an outlet; and a first guard apparatus located between the charge exchange device and a first one of the plurality of input electrodes, wherein the first guard apparatus comprises a first guard electrode adapted to be negatively biased; a high-energy beamline coupled to the outlet of the tandem accelerator, and a low-energy beamline (LEBL) coupled to the inlet of the tandem accelerator.

In some embodiments, the first guard apparatus further includes a first screen.

In some embodiments, the first guard electrode is tubular and located at or proximate to an inlet of the charge exchange device.

In some embodiments, the first guard electrode is a set of rings that are located at or proximate to an inlet of the charge exchange device.

In some embodiments, the first guard electrode is adapted to attract positive particles from the gas and repel negative particles.

In some embodiments, the first one of the plurality of input electrodes is the input electrode closest in proximity to the charge exchange device. The first one of the plurality of input electrodes can be adapted to attract positive particles from the gas and repel negative particles.

In some embodiments, the tandem accelerator further includes a plurality of nested chambers surrounding the charge exchange device, each chamber having at least one of the plurality of input electrodes or at least one of the plurality of output electrodes.

In some embodiments, the first guard apparatus is located between the charge exchange device and an innermost one of the plurality of chambers.

In some embodiments, a biasing voltage of the first guard electrode is between about −100 and −500 V.

In some embodiments, the plurality of input electrodes and the plurality of output electrodes are biased at positive voltages.

In some embodiments, the plurality of output electrodes has the same number of electrodes as the plurality of input electrodes.

In some embodiments, the gas is Argon.

In some embodiments, the system is further configured for use in boron neutron capture therapy (BNCT) and includes a target assembly having lithium.

In many embodiments, a charge exchange system is provided that includes: a charge exchange device adapted to hold a medium configured to convert a particle beam from a first charge to a second charge; and a guard electrode adapted to suppress escape of secondary ions from the charge exchange device.

In some embodiments, the medium is a solid, liquid, or gas.

In some embodiments, the guard electrode is adapted to be negatively biased with respect to the charge exchange device.

In some embodiments, the charge exchange system further includes a screen electrode positioned adjacent the guard electrode.

In some embodiments, the first charge is negative and the second charge is positive.

In some embodiments, the first charge is positive in the second charge is negative.

In some embodiments, the charge exchange system is adapted for use within a tandem accelerator of a neutron beam system.

In some embodiments, the guard electrode is adjacent to either an inlet of the charge exchange device or an outlet of the charge exchange device.

In many embodiments, a system is provided that includes: a charge exchange device comprising a tubular structure having an inlet and an outlet; and a first guard apparatus comprising a first guard electrode and a first screen electrode, wherein the first guard apparatus is adjacent the inlet of the charge exchange device.

In some embodiments, the first guard electrode is ring-shaped and the first screen electrode is ring-shaped, where an outer diameter of the first guard electrode is smaller than an inner diameter of the first screen electrode. The first guard electrode and the first screen electrode can be aligned with a beam axis of the charge exchange device.

In some embodiments, the first guard apparatus includes a plurality of first guard electrodes and a plurality of first screen electrodes, where the plurality of first guard electrodes are positioned within the plurality of first screen electrodes.

In some embodiments, the tubular structure is adapted to hold a gaseous medium capable of converting a negative ion beam into a positive ion beam. The first guard electrode can be biased negatively with respect to the tubular structure.

The first screen electrode can be biased at a ground potential or a positive potential with respect to the tubular structure.

In some embodiments, the system further includes a tandem accelerator, where the charge exchange device and first guard apparatus are located within a high-voltage chamber of the tandem accelerator. In some embodiments, the tandem accelerator includes a plurality of input electrodes adapted to be positively biased with respect to the tubular structure, where the first guard electrode and the first screen electrode are between the plurality of input electrodes and the inlet of the charge exchange device. The system can further include a target assembly adapted to generate neutrons when impacted by a positive particle beam output by the tandem accelerator. The system can be adapted for use in boron neutron capture therapy (BNCT).

In many embodiments, a system is provided that includes: a charge exchange device comprising a tubular structure having an inlet and an outlet; and a first guard apparatus comprising a first guard electrode and a first screen electrode, wherein the first guard apparatus is adjacent the outlet of the charge exchange device.

In some embodiments, the first guard electrode is ring-shaped and the first screen electrode is ring-shaped, where an outer diameter of the first guard electrode is smaller than an inner diameter of the first screen electrode. The first guard electrode and the first screen electrode can be aligned with a beam axis of the charge exchange device.

In some embodiments, the first guard apparatus includes a plurality of first guard electrodes and a plurality of first screen electrodes, where the plurality of first guard electrodes are positioned within the plurality of first screen electrodes.

In some embodiments, the tubular structure is adapted to hold a gaseous medium capable of converting a negative ion beam into a positive ion beam. The first guard electrode can be biased negatively with respect to the tubular structure. The first screen electrode can be biased at a ground potential or a positive potential with respect to the tubular structure.

In some embodiments, the system further includes a tandem accelerator, where the charge exchange device and first guard apparatus are located within a high-voltage chamber of the tandem accelerator. The tandem accelerator can include a plurality of output electrodes adapted to be positively biased with respect to the tubular structure, where the first guard electrode and the first screen electrode are between the plurality of input electrodes and the outlet of the charge exchange device. The system can further include a target assembly adapted to generate neutrons when impacted by a positive particle beam output by the tandem accelerator. The system can be adapted for use in boron neutron capture therapy (BNCT).

In some embodiments, the system further includes a second guard apparatus comprising a second guard electrode and a second screen electrode, wherein the second guard apparatus is adjacent the in the of the charge exchange device.

In many embodiments, a method is provided that includes: forming a negative particle beam; and applying the negative particle beam to a charge exchange device while a first guard apparatus adjacent the charge exchange device is biased negatively with respect to the charge exchange device, where the charge exchange device converts the negative particle beam to a positive particle beam and forms positive secondary ions, and where the first guard apparatus attracts the positive secondary ions.

In some embodiments, the first guard apparatus is adjacent to an inlet to the charge exchange device. The negative particle beam can be applied to the charge exchange device while a second guard apparatus adjacent to an outlet of the charge exchange device is biased negatively with respect to the charge exchange device. The first guard apparatus can include a first guard electrode biased negatively with respect to the charge exchange device and the second guard apparatus can include a second guard electrode biased negatively with respect to the charge exchange device. The first guard apparatus can include a first screen electrode and the second guard apparatus comprises a second screen electrode. Applying the negative particle beam to the charge exchange device can include accelerating the negative particle beam with a plurality of input electrodes. The method can further include accelerating the positive particle beam away from the charge exchange device with a plurality of output electrodes. The method can further include applying the positive particle beam to a target apparatus such that the positive particle beam is at least partly converted into a neutron beam.

In many embodiments, a system is provided that includes: a charge exchange device having an inlet, a lumen fillable with a gas adapted to convert an incoming negative particle beam to a positive particle beam, and an outlet; and an aperture structure located in close proximity with the inlet, wherein the aperture structure has an annular shape with an inner aperture sized to permit passage of the negative particle beam when in an aligned state, and wherein the aperture structure is configured to at least partially shield the charge exchange device when the negative particle beam is in a misaligned state.

In some embodiments, the aperture structure is connected to current sensor circuitry configured to monitor a beam current through the aperture structure.

In some embodiments, the system further includes a control device configured to monitor the beam current and take an action in response to detection of an increase in beam current. The action can include one or more of causation of or issuance of an instruction for: the output of an indication of increased current or beam maladjustment; a safety action or activation of a safety mechanism; adjustment of beam energy and/or alignment; adjustment of gas discharge within the charge exchange device; adjustment of coolant flow to the charge exchange device; and/or deactivation of one or more components of the system to cease beam propagation through the charge exchange device.

In some embodiments, the aperture structure is in spaced relation to the inlet.

In some embodiments, the aperture structure is affixed to the inlet.

In some embodiments, the aperture structure is a first aperture structure, and the system includes a second aperture structure downstream of and in close proximity with the outlet.

In some embodiments, the system further includes an accelerator having: a plurality of input electrodes adapted to be biased at sequentially increasing positive voltages to accelerate the negative beam; a plurality of output electrodes adapted to be biased at sequentially decreasing positive voltages to accelerate the positive beam away from the charge exchange device; and a first guard apparatus located between the charge exchange device and the plurality of input electrodes, wherein the first guard apparatus includes a first guard electrode adapted to be negatively biased with respect to the charge exchange device. The system can be configured to adjustably bias the aperture structure and first guard apparatus at the same voltage. The system can be configured to adjustably bias the aperture structure and first guard apparatus at different voltages.

In some embodiments, the system is configured to adjustably bias the aperture structure and charge exchange device at the same voltage.

In some embodiments, the system is configured to adjustably bias the aperture structure and the charge exchange device at different voltages.

In some embodiments, the aperture structure is a ring-shaped plate.

In some embodiments, the inner aperture has a width that is equal to or less than a width of the inlet of the charge exchange device.

In many embodiments, a neutron beam system is provided that includes: a tandem accelerator having a plurality of input electrodes adapted to be sequentially increasingly positively biased to accelerate a negative beam from an inlet, a charge exchange device having a lumen fillable with a gas adapted to convert the negative beam to a positive beam, a plurality of output electrodes adapted to be sequentially decreasingly positively biased to accelerate the positive beam from the charge exchange device to an outlet, and an aperture structure located in close proximity with the inlet, wherein the aperture structure has an annular shape with an inner aperture sized to permit passage of the negative beam when in an aligned state, and wherein the aperture structure is configured to at least partially shield the charge exchange device when the negative beam is in a misaligned state; a high-energy beamline coupled to the outlet of the tandem accelerator; and a low-energy beamline (LEBL) coupled to the inlet of the tandem accelerator.

In many embodiments, a method is provided that includes: forming a negative particle beam; applying the negative particle beam to a charge exchange device while an aperture structure adjacent the charge exchange device is biased, wherein the charge exchange device converts the negative particle beam to a positive particle beam; and measuring current through the aperture structure.

In some embodiments, the method further includes taking an action in response to measurement of increased current through the aperture structure. The action can include one or more of: outputting an indication of increased current or beam maladjustment; activating a safety mechanism; adjusting beam energy and/or alignment; adjusting gas discharge within the charge exchange device; adjusting coolant flow in the charge exchange device; and/or ceasing beam propagation through the charge exchange device.

It should be noted that all features, elements, components, functions, and steps described with respect to any embodiment provided herein are intended to be freely combinable and substitutable with those from any other embodiment. If a certain feature, element, component, function, or step is described with respect to only one embodiment, then it should be understood that that feature, element, component, function, or step can be used with every other embodiment described herein unless explicitly stated otherwise. This paragraph therefore serves as antecedent basis and written support for the introduction of claims, at any time, that combine features, elements, components, functions, and steps from different embodiments, or that substitute features, elements, components, functions, and steps from one embodiment with those of another, even if the following description does not explicitly state, in a particular instance, that such combinations or substitutions are possible. It is explicitly acknowledged that express recitation of every possible combination and substitution is overly burdensome, especially given that the permissibility of each and every such combination and substitution will be readily recognized by those of ordinary skill in the art.

As used herein and in the appended claims, the singular forms “a,” “an,” and “the” include plural referents unless the context clearly dictates otherwise.

While the embodiments are susceptible to various modifications and alternative forms, specific examples thereof have been shown in the drawings and are herein described in detail. It should be understood, however, that these embodiments are not to be limited to the particular form disclosed, but to the contrary, these embodiments are to cover all modifications, equivalents, and alternatives falling within the spirit of the disclosure. Furthermore, any features, functions, steps, or elements of the embodiments may be recited in or added to the claims, as well as negative limitations that define the inventive scope of the claims by features, functions, steps, or elements that are not within that scope.

What is claimed is:

1. A system, comprising:

a charge exchange device having an inlet, a lumen fillable with a gas adapted to convert an incoming negative particle beam to a positive particle beam, and an outlet; and an aperture structure located in close proximity with the inlet, wherein the aperture structure has an annular shape with an inner aperture sized to permit passage of the incoming negative particle beam when in an aligned state, and wherein the aperture structure is configured to at least partially shield the charge exchange device when the incoming negative particle beam is in a misaligned state.

2. The system of claim 1, wherein the aperture structure is in spaced relation to the inlet.

3. The system of claim 1, wherein the aperture structure is affixed to the inlet.

4. The system of claim 1, further comprising a second aperture structure downstream of and in close proximity with the outlet.

5. The system of claim 1, further comprising an accelerator comprising:

a plurality of input electrodes adapted to be biased at sequentially increasing positive voltages to accelerate the incoming negative particle beam;

a plurality of output electrodes adapted to be biased at sequentially decreasing positive voltages to accelerate the positive particle beam away from the charge exchange device; and a first guard apparatus located between the charge exchange device and the plurality of input electrodes, wherein the first guard apparatus comprises a first guard electrode adapted to be negatively biased with respect to the charge exchange device.

6. The system of claim 5, further comprising one or more power supplies configured to adjustably bias the aperture structure and first guard apparatus at a same voltage.

7. The system of claim 5, further comprising one or more power supplies configured to adjustably bias the aperture structure and first guard apparatus at different voltages.

8. The system of claim 1, further comprising one or more power supplies configured to adjustably bias the aperture structure and charge exchange device at a same voltage.

9. The system of claim 1, further comprising one or more power supplies configured to adjustably bias the aperture structure and the charge exchange device at different voltages.

10. The system of claim 1, wherein the aperture structure is a ring-shaped plate.

11. The system of claim 1, wherein the inner aperture has a width that is equal to or less than a width of the inlet of the charge exchange device.

12. A neutron beam system comprising:

a tandem accelerator comprising:

a plurality of input electrodes adapted to be sequentially increasingly positively biased to accelerate a negative beam from an inlet; a charge exchange device having a lumen fillable with a gas adapted to convert the negative beam to a positive beam;

a plurality of output electrodes adapted to be sequentially decreasingly positively biased to accelerate the positive beam from the charge exchange device to an outlet; and an aperture structure located in close proximity with the inlet, wherein the aperture structure has an annular shape with an inner aperture sized to permit passage of the negative beam when in an aligned state, and wherein the aperture structure is configured to at least partially shield the charge exchange device when the negative beam is in a misaligned state;

a high-energy beamline coupled to the outlet of the tandem accelerator; and a low-energy beamline (LEBL) coupled to the inlet of the tandem accelerator.

13. A method comprising:

forming a negative particle beam;

applying the negative particle beam to a charge exchange device while an aperture structure adjacent the charge exchange device is biased, wherein the charge exchange device converts the negative particle beam to a positive particle beam; and measuring current through the aperture structure.

14. The method of claim 13, further comprising taking an action in response to measurement of increased current through the aperture structure, wherein the action comprises one or more of:

outputting an indication of increased current or beam maladjustment, activating a safety mechanism, adjusting beam energy and/or alignment, adjusting gas discharge within the charge exchange device, adjusting coolant flow in the charge exchange device, or ceasing beam propagation through the charge exchange device.

* * * * *